Inventor
FRANK COWLISHAW
By Toulmin & Toulmin
Attorneys

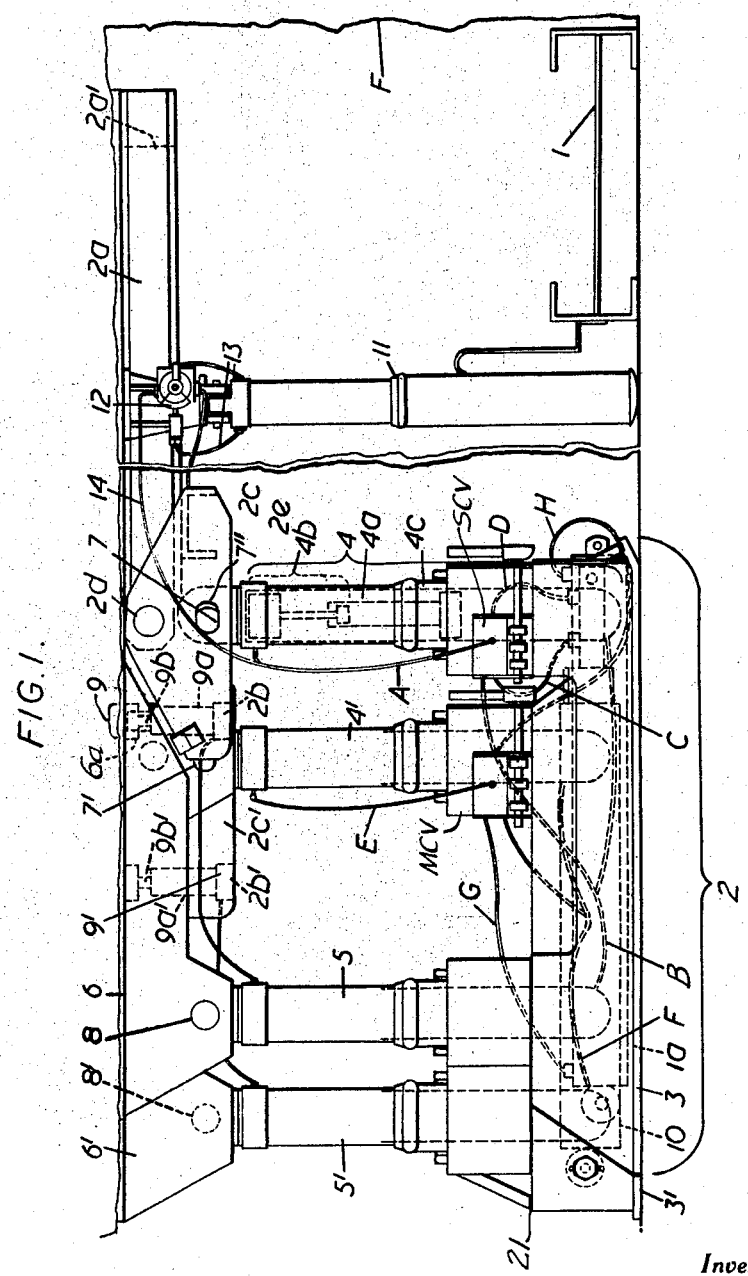

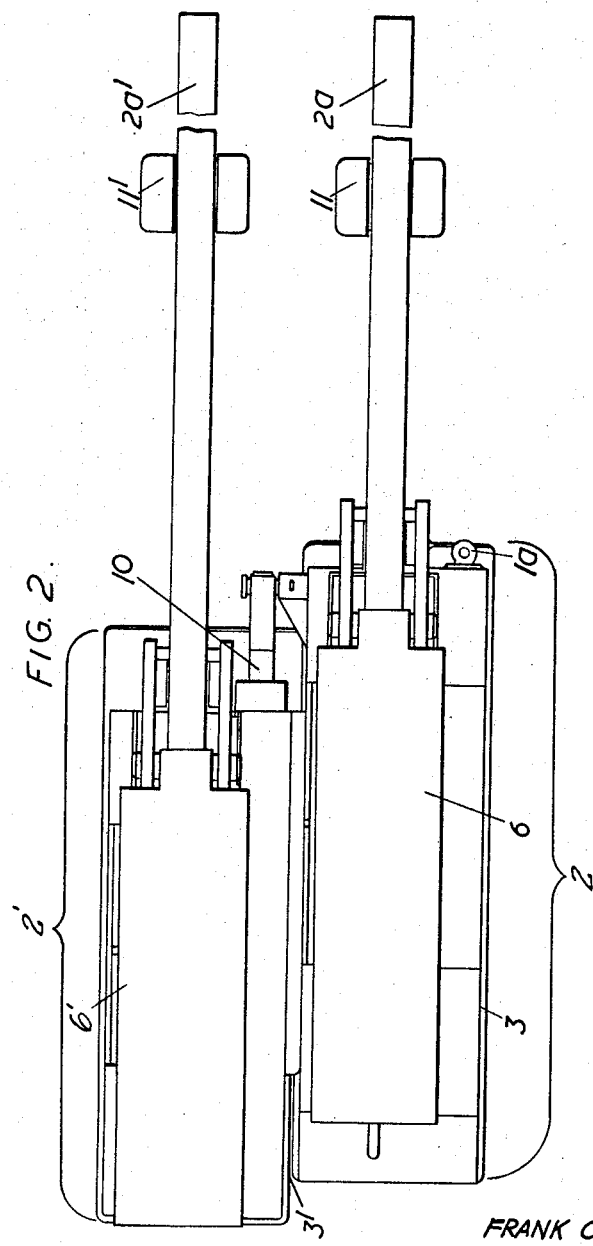

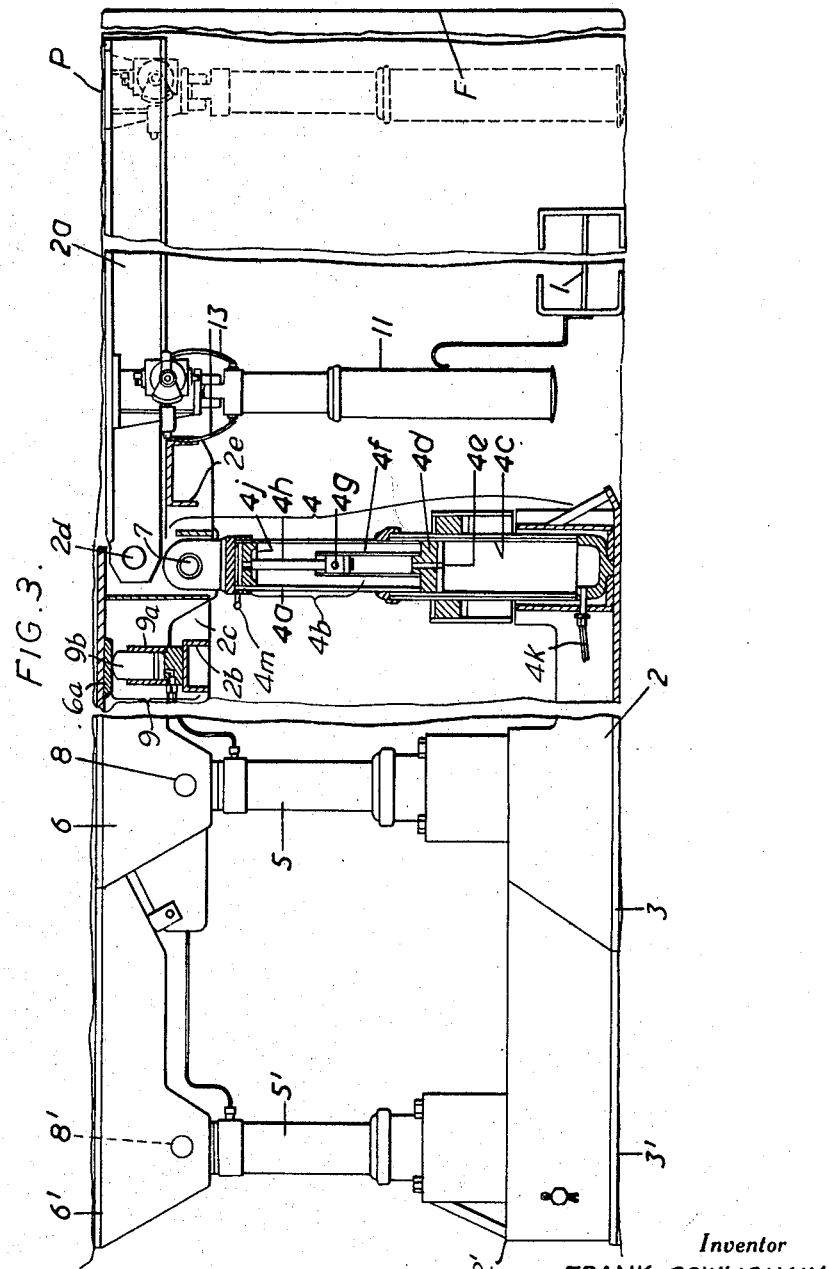

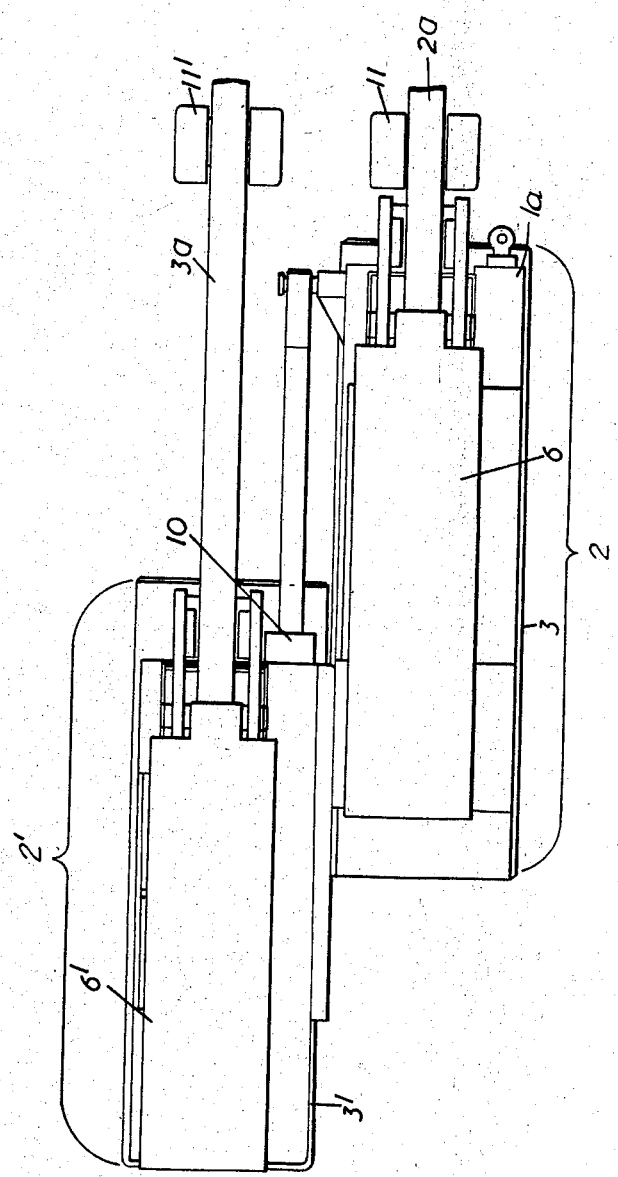

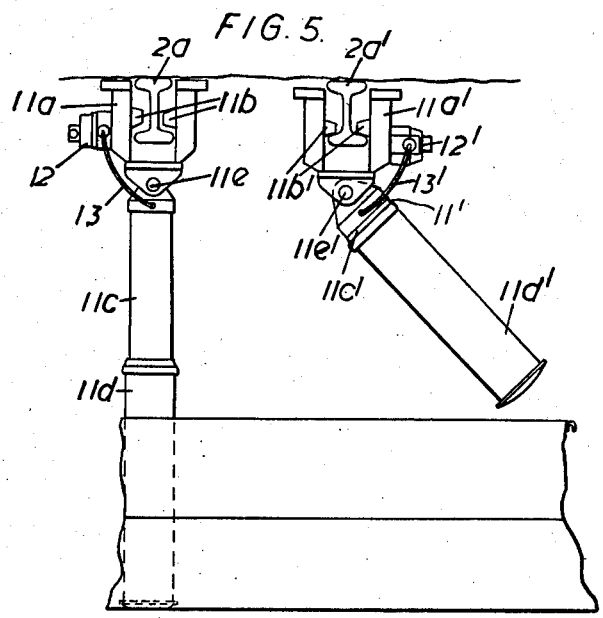
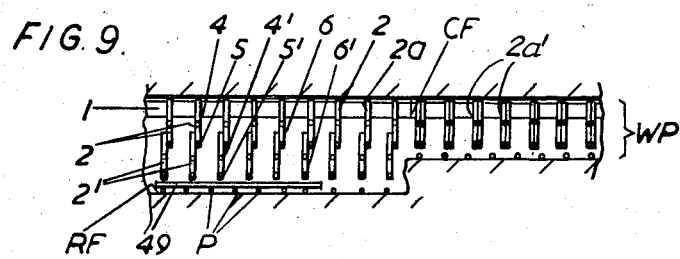
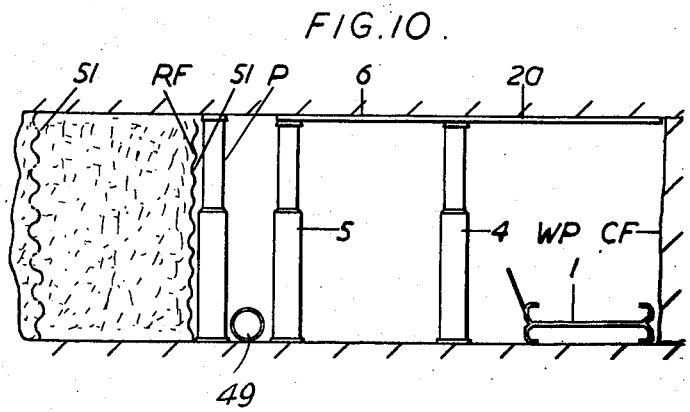

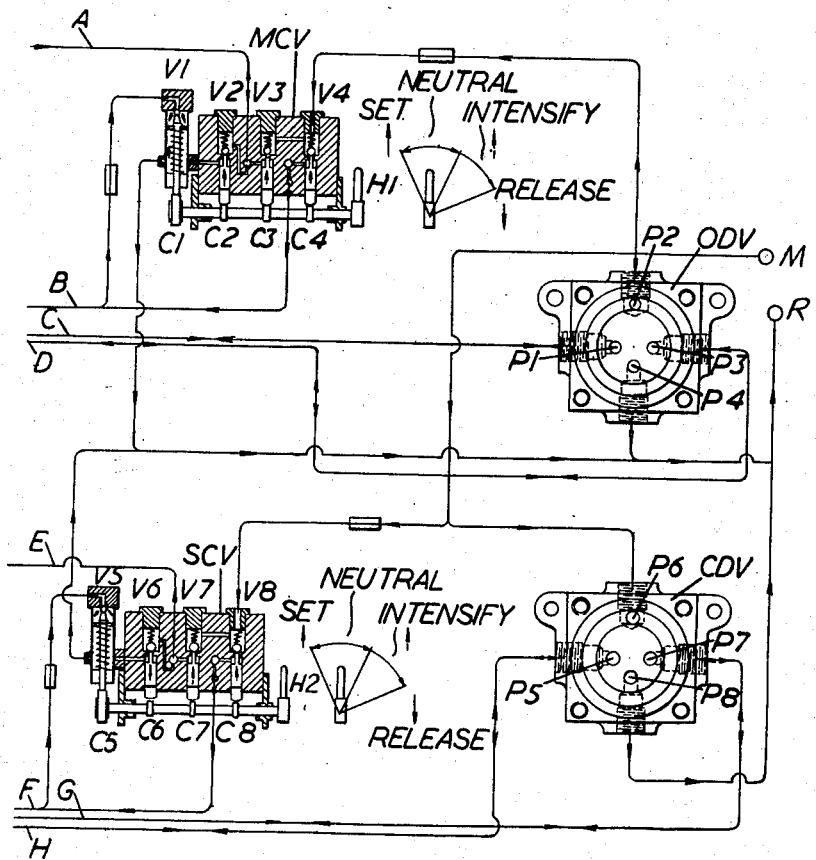

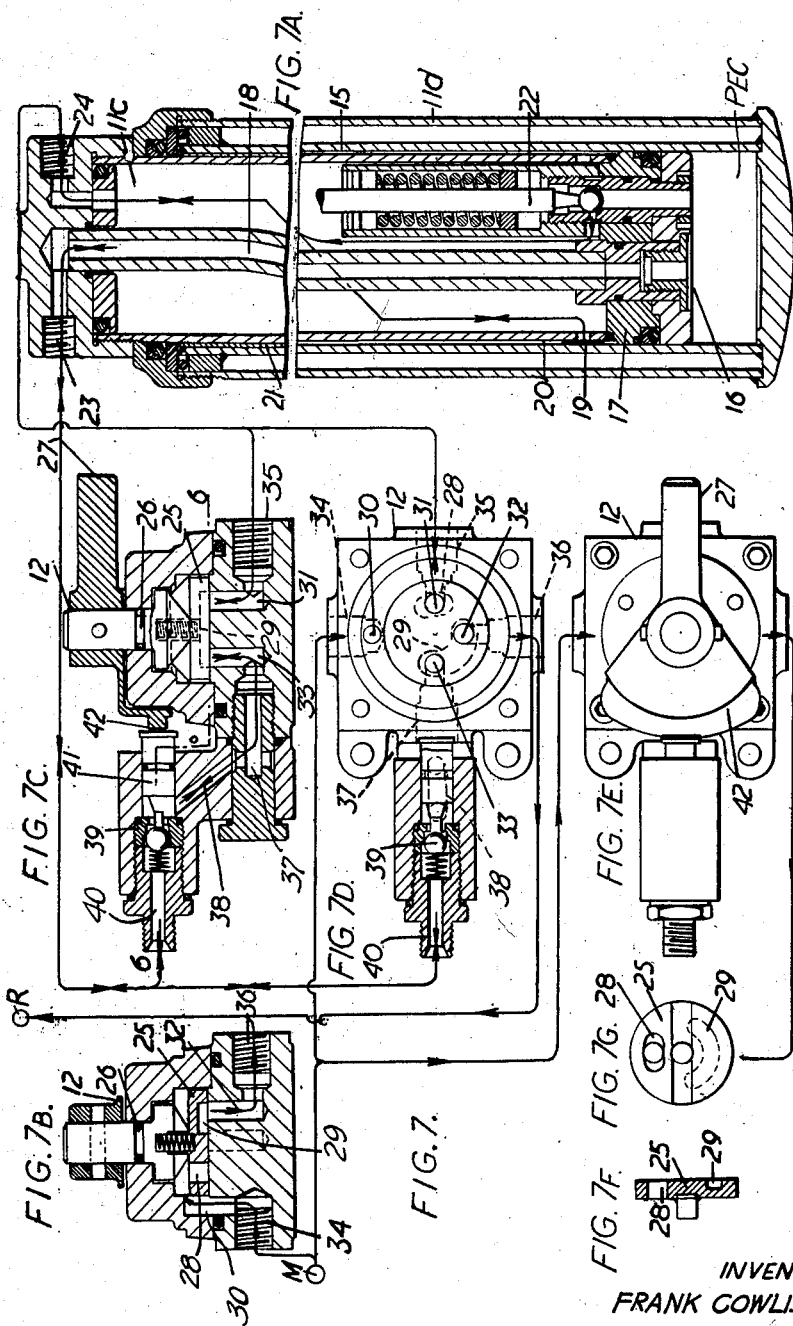

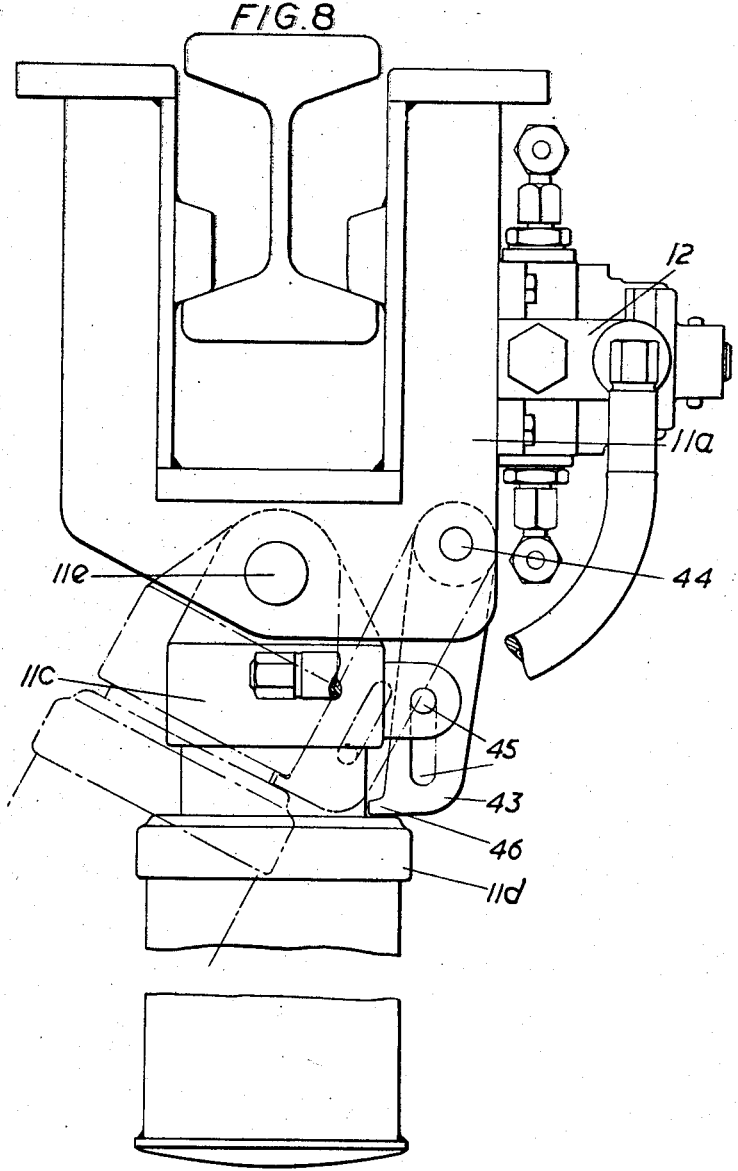

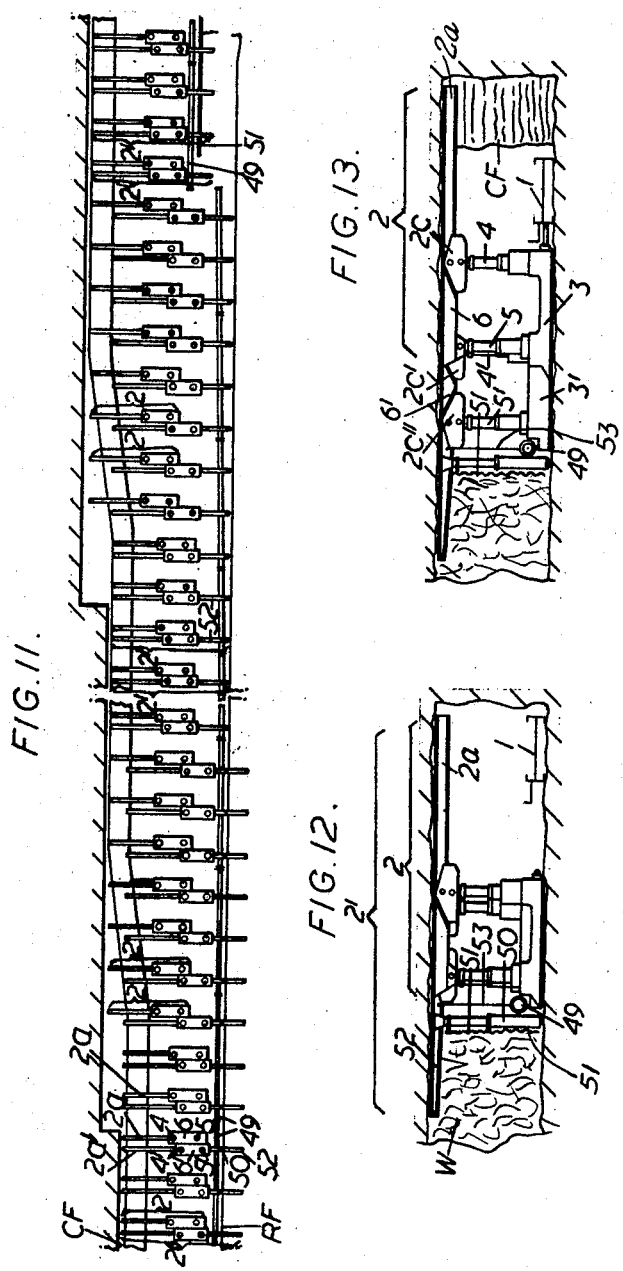

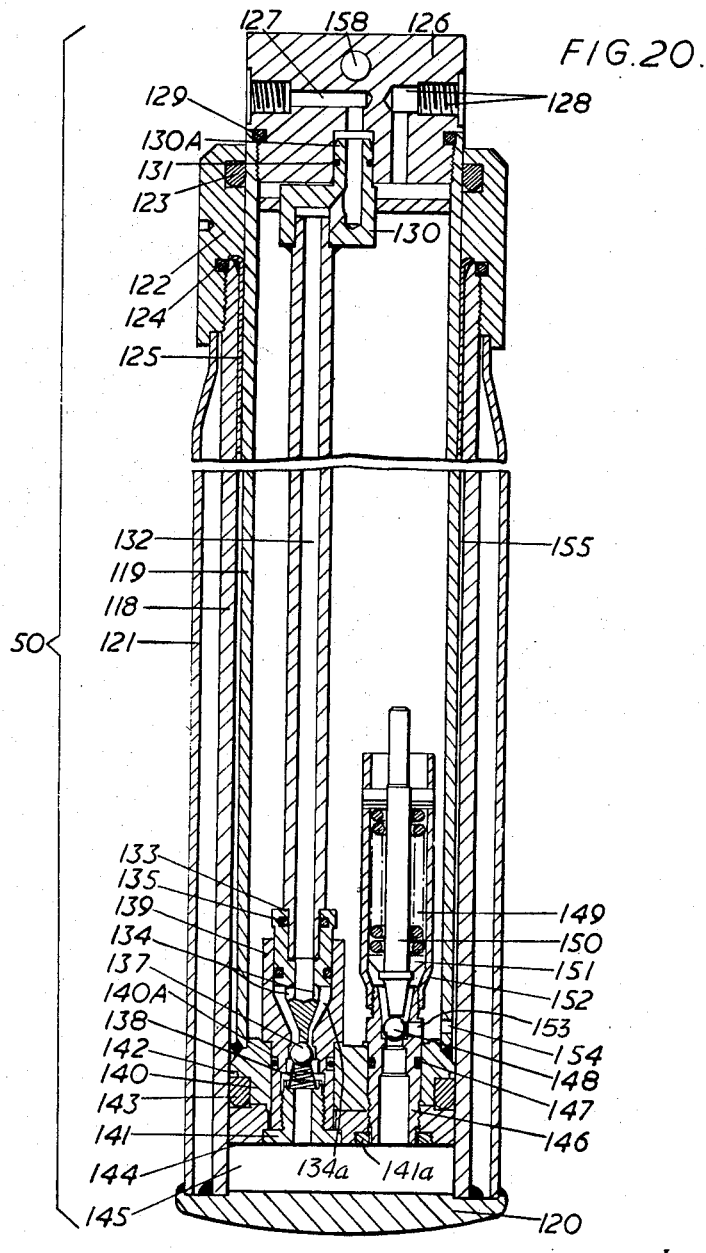

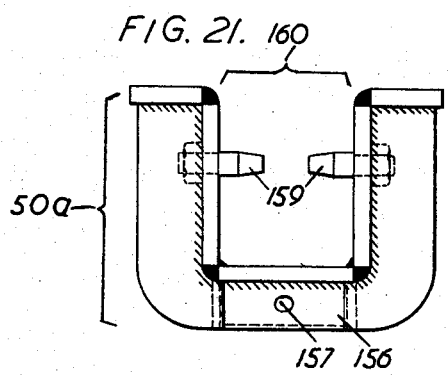
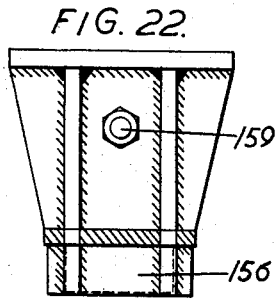
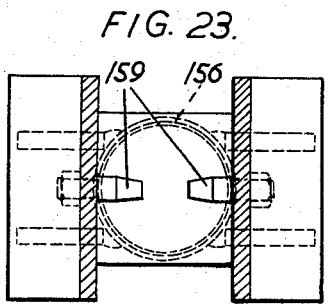

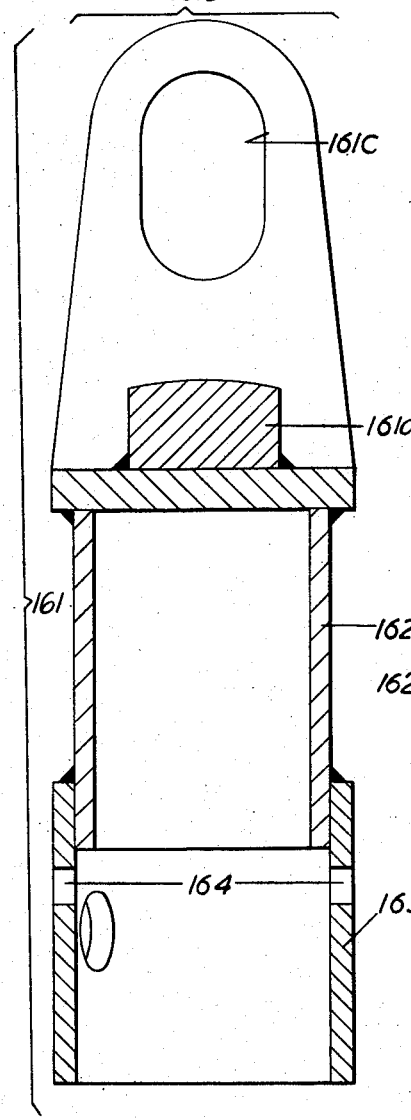
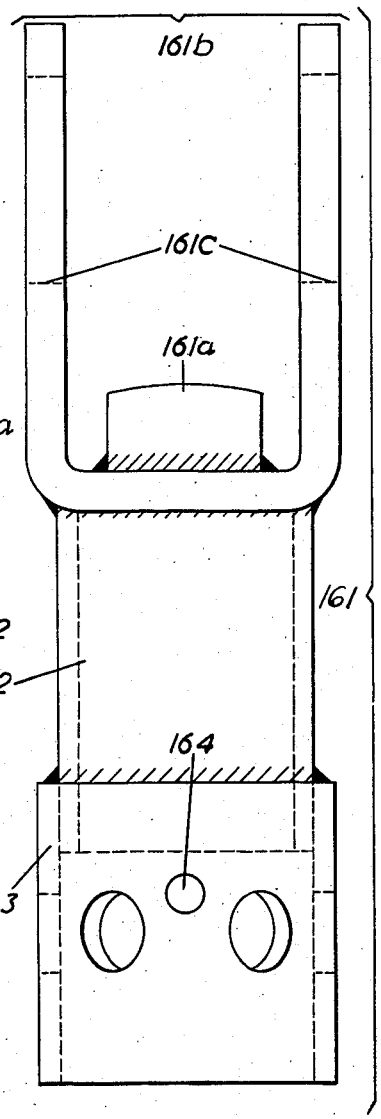

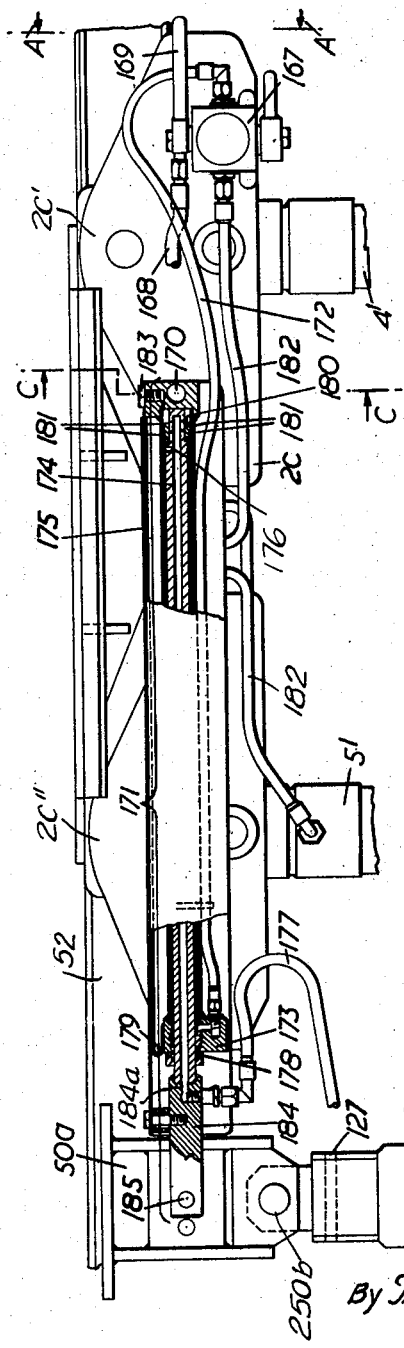

Inventor
FRANK COWLISHAW
By Toulmin & Toulmin
Attorneys

Aug. 11, 1964   F. COWLISHAW   3,143,862
SUPPORT OF ROOFS IN MINES
Filed Aug. 10, 1959   26 Sheets-Sheet 17

*Inventor*
FRANK COWLISHAW
By Toulmin & Toulmin
*Attorneys*

Aug. 11, 1964 F. COWLISHAW 3,143,862
SUPPORT OF ROOFS IN MINES
Filed Aug. 10, 1959 26 Sheets-Sheet 18
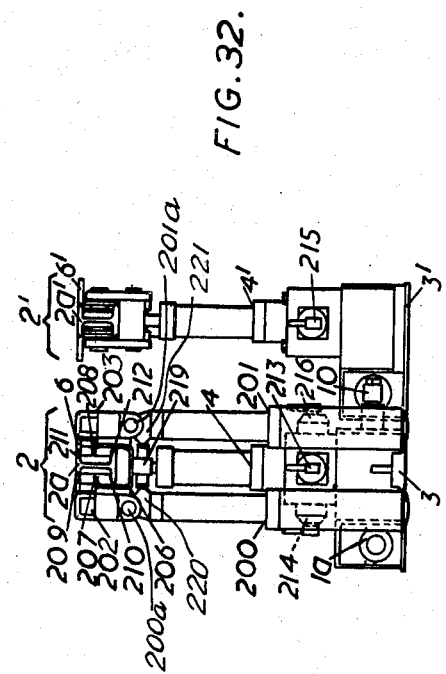
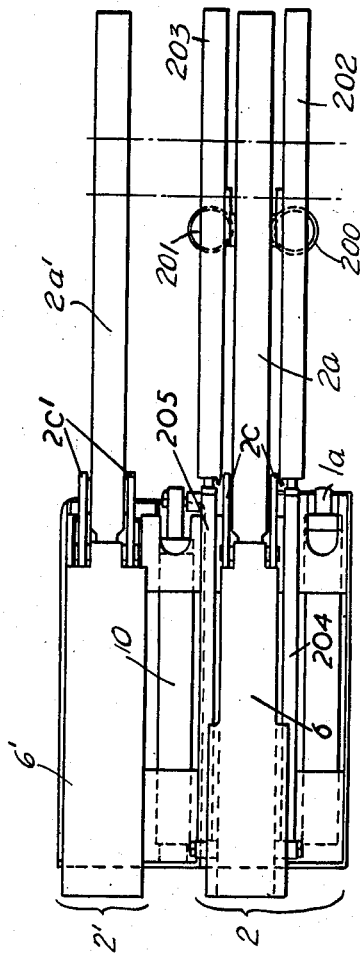
Inventor
FRANK COWLISHAW
By Toulmin & Toulmin
Attorneys

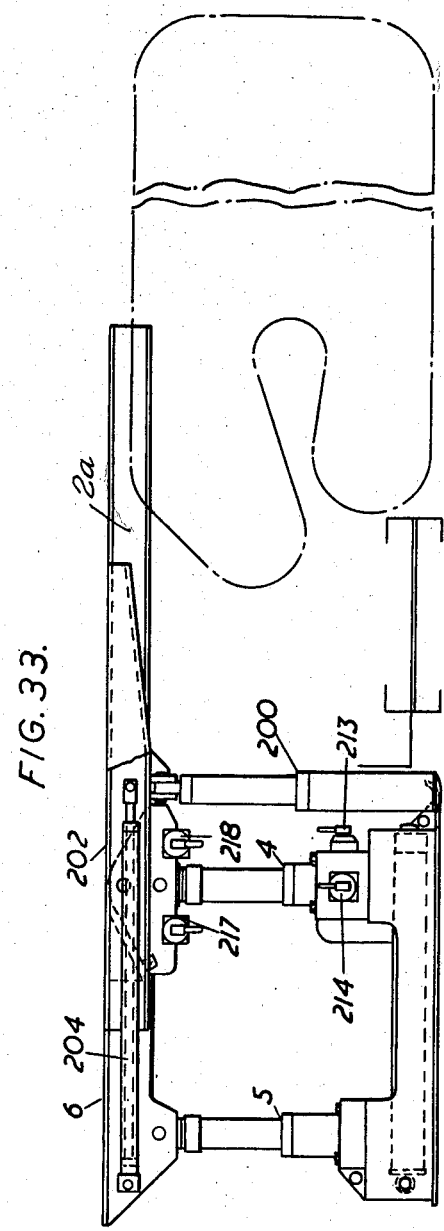

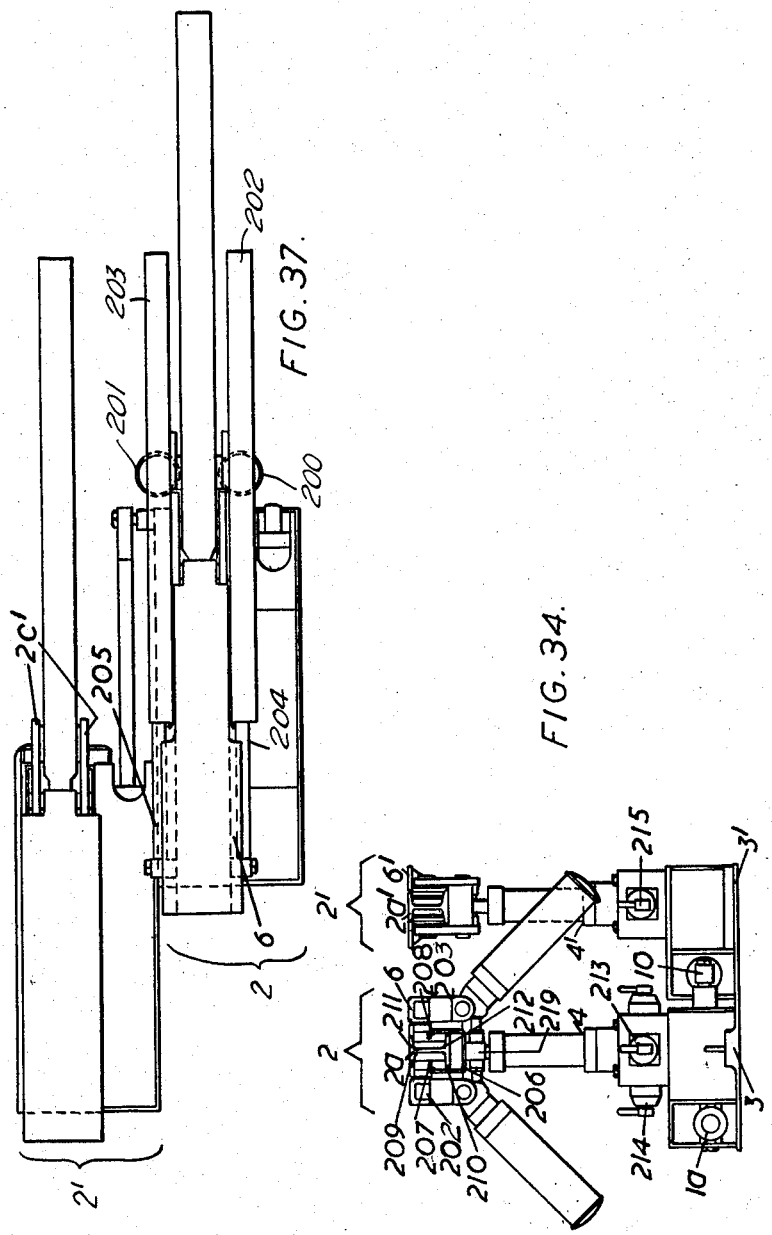

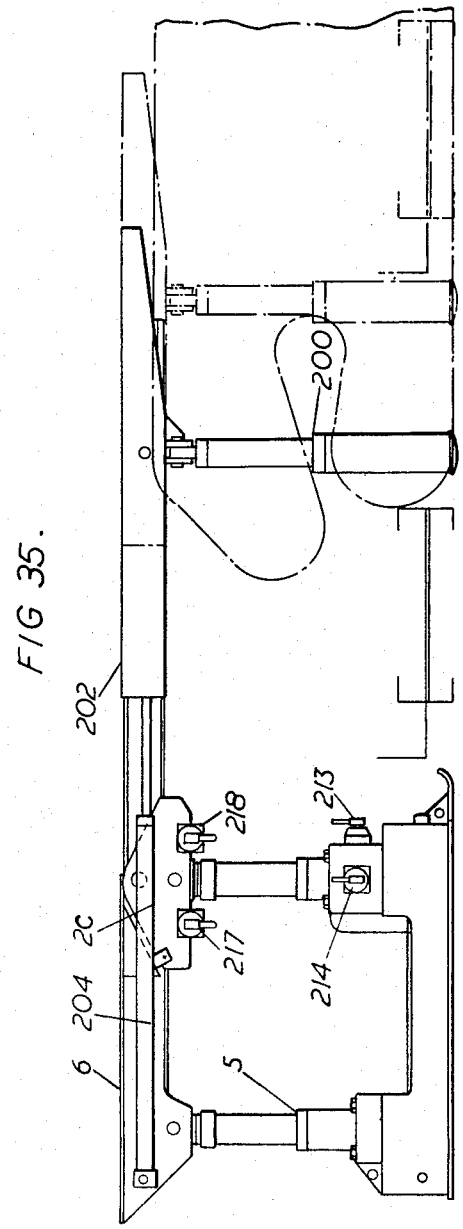

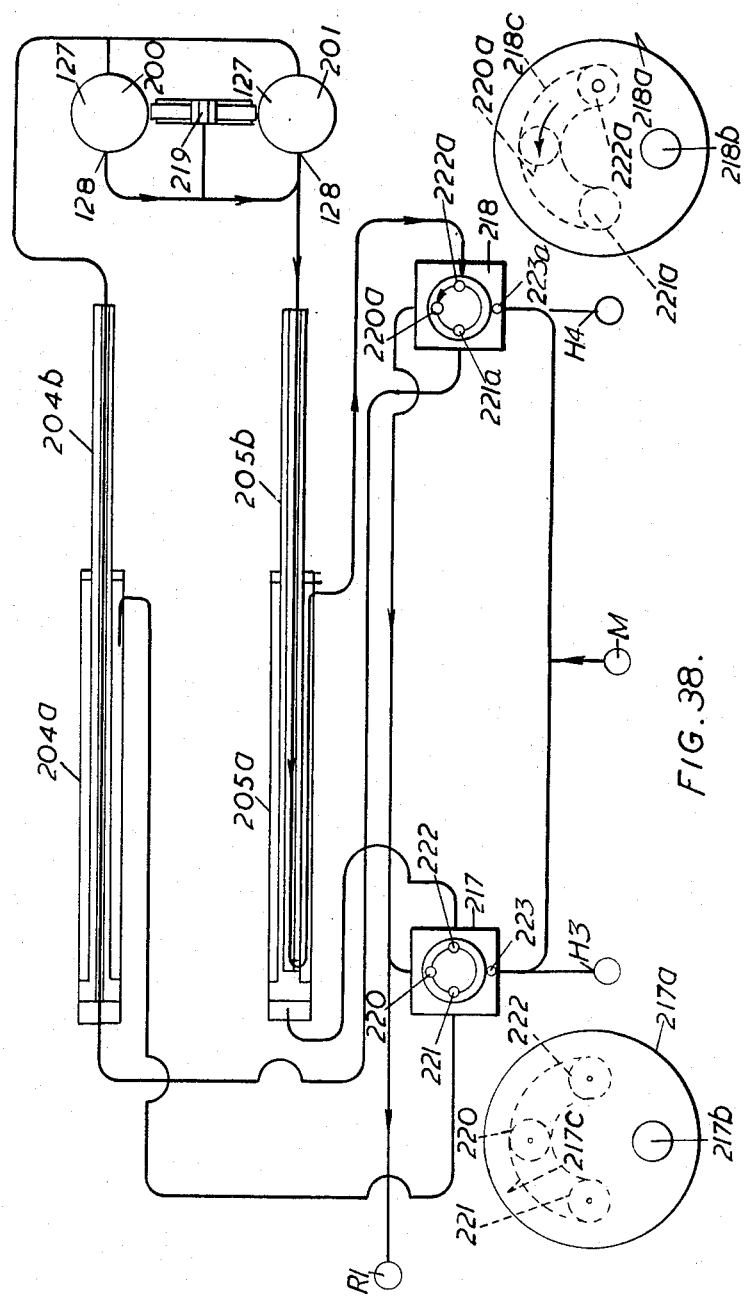

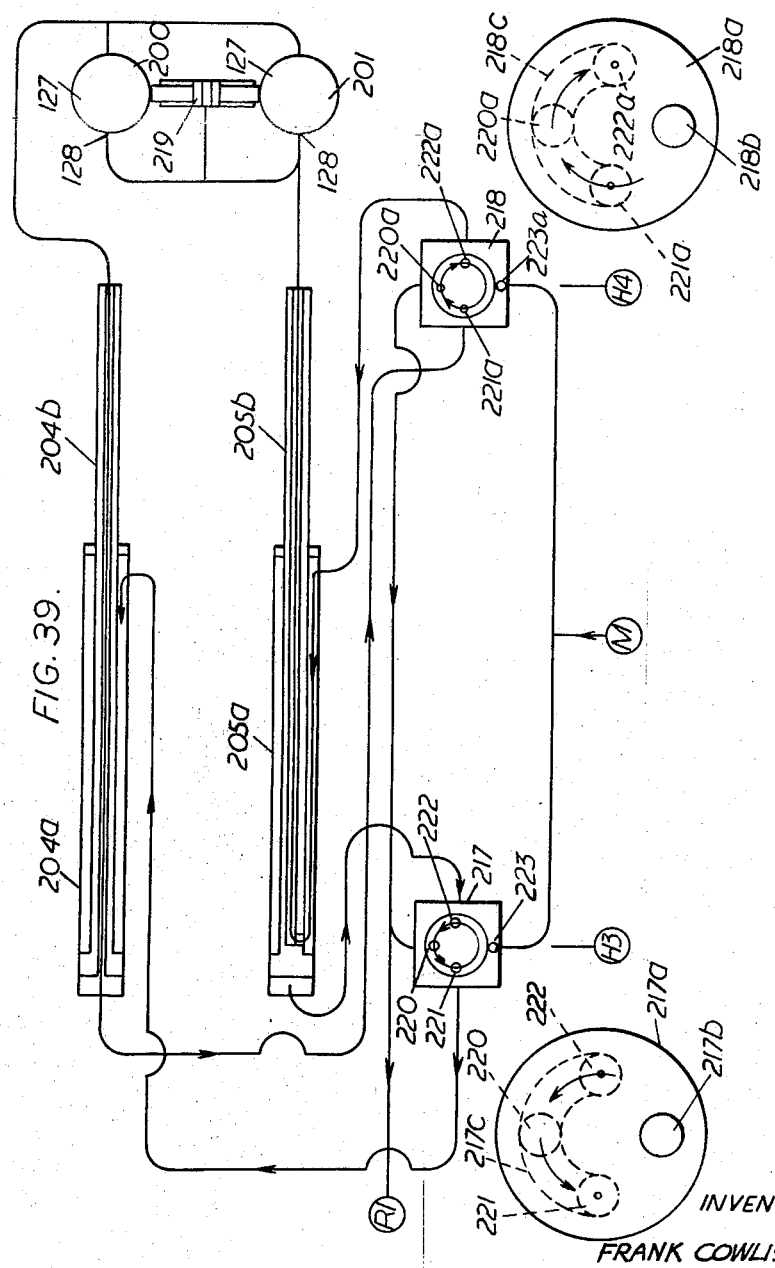

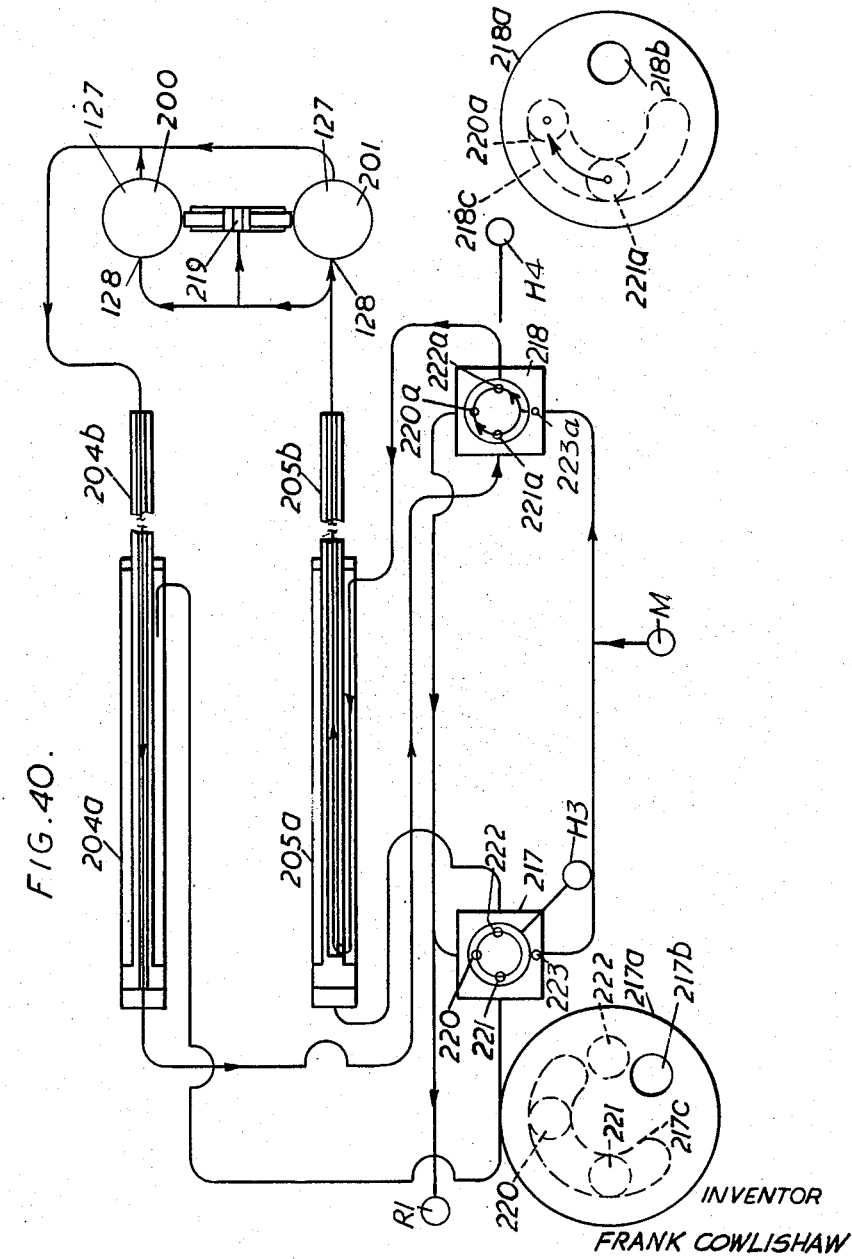

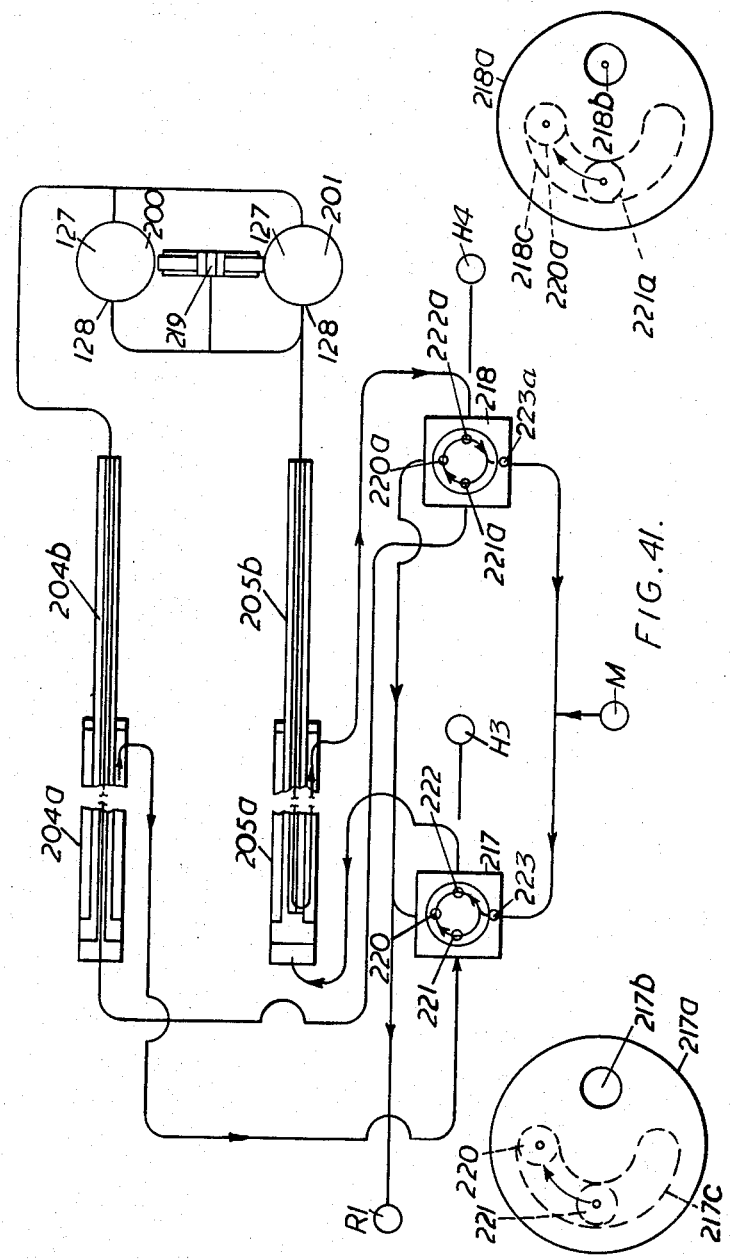

United States Patent Office 3,143,862
Patented Aug. 11, 1964

3,143,862
SUPPORT OF ROOFS IN MINES
Frank Cowlishaw, Linby, England, assignor to W. E. & F. Dobson Limited, New Basford, Nottingham, England
Filed Aug. 10, 1959, Ser. No. 832,696
Claims priority, application Great Britain Aug. 11, 1958
14 Claims. (Cl. 61—45)

This invention concerns improvements in and relating to the support of roofs in mines, primarily in coal mines where there is a working face conveyor and a cutting machine which travels along the working face between it and the conveyor.

In effect the mining operation involves the progressive advance of the underground passage containing the working face, the working face being progressively cut away by a cutting machine, the conveyor and roof support means being progressively advanced, and the opposite face being also progressively advanced by the progressive stowing of waste from stowing pipes between it and progressively advanced barrier means.

The paramount importance of obtaining adequate roof support has led to the use of main hydraulic supports of composite nature by the employment of two or more hydraulic props on a common base and joining them by a top beam, together with separate hydraulic props employed in front of and behind the main supports.

Where front hydraulic props are used between the conveyor and the working face, the disadvantage exists that in order to maintain forward roof support by the front props whilst advancing the conveyor it has been necessary to dismantle the conveyor and re-assemble it in front of the front props and the front props have to be manually re-positioned in front of the conveyor and so on in a manner which is both laborious and undesirably lengthy.

In the instance of rear props used in the rear stowing of waste, these again, together with advance of stowing pipe sections and barrier sections, have had to be re-positioned in each advance manually in laborious and lengthy manner.

A particular disadvantage of the excessive length of time to re-position the props is that the forward and rear parts of the roof remain unsupported for the same undesirable length of time.

An object of the invention is to avoid or considerably minimise these disadvantages by the pressure control of at least auxiliary props from the main supports.

Another object of the invention is to provide a roof support with forward cantilever and auxiliary support means operable on the cantilever to pass over a conveyor and be roof supporting at opposite sides of the conveyor.

A further object is to carry out stowing operations employing rear auxiliary support means.

A still further object is to provide a roof support with adequate supporting power and front auxiliary support means for particularly deep cut seams.

The invention provides roof support means for use in mines comprising an upwardly extendable and oppositely contractible main roof support with projecting cantilever head, pressure operated means operably associated with the main roof support for pressurising it in roof supporting manner and releasing the pressure, auxiliary prop means attached to the projecting cantilever means, and pressure operable means operably associated with the auxiliary prop means for pressurising the latter in roof supporting manner and releasing the pressure. Conveniently the auxiliary prop means is operable to depend from the cantilever head means well clear of the ground, when not roof supporting, so as to allow for the presence beneath it of another body such for example as a conveyor. The cantilever head means may consist of a forwardly and/or rearwardly projecting cantilever head. The auxiliary prop means may consist of one or more auxiliary props attached to the forwardly and/or rearwardly projecting cantilever heads.

The auxiliary props are conveniently displaceable along the cantilever head by pressure operated means, and also extendable and contractable by pressure operated means. The latter means may include fluid operated valve means interiorly of the props to be self-sustaining after pressurization independently of external fluid pressure until required to release.

The auxiliary props may be laterally swingable clear of other bodies such as a conveyor, either mechanically or hydraulically, The auxiliary prop means when on rear cantilever heads may have other bodies such for example as stowing barrier sections attached thereto, When front auxiliary props are employed there may be also front auxiliary top beams slidable alongside the front cantilever heads, there being pressure operated means to slide the auxiliary top beams, and the front auxiliary props hanging from the front top beams to be carried with them.

The invention provides for the intensification of pressure in at least certain of the supporting props.

The invention also provides for cantilever heads to be pivoted and for pressure operated means for pressurising the cantilever heads in roof supporting manner.

The invention further provides side by side master and slave supports each comprising front and rear props on a common base, with joining top beam, and lower horizontal cylinder and ram means for relative advance of the two supports and of a conveyor.

FIGURE 1 is a general side view of roof support means with auxiliary hanging props according to the invention;
FIGURE 2 is a plan view of FIGURE 1;
FIGURE 3 is a similar view to FIGURE 1 showing parts in different positions;
FIGURE 4 is a plan view of FIGURE 3;
FIGURE 5 is an end view of part of the roof support means;
FIGURE 6 is a hydraulic circuit for control of the main support structure and conveyor;
FIGURE 7 is a composite illustration of the auxiliary prop (FIGURE 7A) and its connections with a fluid control valve as the latter is seen in cross section (FIGURE 7B), side section (FIGURE 7C), plan section (FIGURE 7D) and plan (FIGURE 7E), with detail cross sectional and plan views (FIGURES 7F and 7G) of a disc valve member;
FIGURE 8 is an elevational view showing a modified auxiliary prop;
FIGURE 9 is a plan view somewhat diagrammatically showing a sectional length of the underground working passage in coal mining, and illustrating a known method of progressively advancing the passage in width wise direction by extraction of coal from the working face and stowing of waste at the rear;
FIGURE 10 is a diagrammatic cross section of said passage further illustrating the known method;
FIGURE 11 is a somewhat similar plan view to FIGURE 9 but showing the arrangement according to the invention;
FIGURES 12 to 16 are cross sectional views somewhat similar to FIGURE 9 showing the invented arrangement in progressive steps;
FIGURES 17 to 19 are views similar to FIGURES 11 to 15 showing a modification of the invented arrangement;
FIGURE 20 is a cross sectional view of a rear pit prop with internal valve control for use in the invented arrangement;
FIGURES 21 to 23 are front, side and plan views of head units for pit props used in the invented arrangement;

FIGURES 24 and 25 are sectional and side views of a forward pit prop head used in the invented arrangement;

FIGURE 26 is a side elevation, partly in section, of a top beam or cross head roof support in the invented arrangement;

FIGURE 31 is a side view of roof support means of modified construction according to the invention;

FIGURE 32 is a front view of FIGURE 31;

FIGURE 33 is a similar view to FIGURE 31 with parts in different positions;

FIGURE 34 is a front view of FIGURE 33;

FIGURE 35 is a similar view of FIGURES 31 to 33 showing parts in further different positions;

FIGURE 36 is a plan view of FIGURE 35;

FIGURE 37 is a similar view to FIGURE 36 with parts in different positions;

FIGURES 38 to 42 are diagrammatic illustrations of the hydraulic circuit for controlling a hanging prop in the modification of FIGURES 31 to 37.

Figure 14:
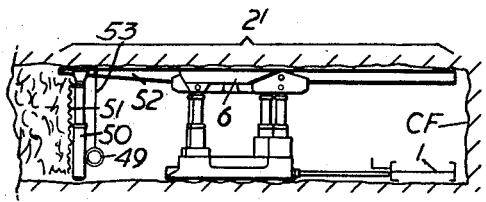

Referring now to FIGURE 1, the roof support means shown by way of example near a working face "F" and at the goaf side of a working face conveyor 1, comprises a hydraulically extendible and contractible main support structure 2 with cantilever head 2a projecting towards the working face "F."

The main support structure 2 comprises a base 3 on which there are mounted front and rear hydraulically extendible and contractible props 4 and 5, and an inverted channel top beam 6 mounted by pivotal connections 7 and 8 respectively on the props 4 and 5. Conveniently the cantilever head 2a is connected to the front end of the top beam pivotally, and fluid pressure-operated means 9 are provided whereby upward fluid pressure is applied to the cantilever head 2a, and relaxed when the main support is respectively roof-supporting and non-roof supporting.

This device 9, shown diagrammatically in broken lines in FIGURE 1 and in full lines in section in FIGURE 3, of an auxiliary cylinder 9a and ram 9b which unit is disposed in a hydraulic circuit (to be described) such that it can be operated to supply upward hydraulic pressure on the cantilever head 2a in addition to the main supports being supplied with upward hydraulic pressure. In the illustrated example the auxiliary cylinder and ram unit is mounted in the inverted channel top beam 6 behind the front main prop 4, the ram 9b being directed upwardly against a plate 6a on the underside of the top beam 6 and the cylinder 9a being on a cross bar 2b of a slipper lever 2c. The latter is pivoted on the same pivot 2d by which the cantilever head 2a is connected to the top beam 6 and said slipper lever 2c is slotted as shown at 7" (FIG. 1) to accommodate the pivot 7. A cross bar 2e is provided on the slipper lever 2c at the front of the front main prop 4 and this cross bar underlies a rear part of the cantilever head 2a. This arrangement is such that pressure downwardly from the auxiliary cylinder and ram unit against resistance of the roof is transmitted by the slipper lever 2c as allowed by the slot 7 equal force and in opposite direction upwardly to the cantilever head 2a.

Each or either prop 4 and 5 incorporates intensifier means which will be described with reference to the front main prop 4 FIG. 1 for example. The ram 4a is hollow and in the interior of the prop there is a differential piston 4b whereby hydraulic pressure supplied in the cylinder 4c from a suitable hydraulic circuit (to be described) is intensified by and applied in the intensified form to the ram for the extension of the prop. In the example illustrated the ram's base 4d (FIGURE 3) has a duct 4e communicating between the interior of the cylinder 4c and a tube 4f projecting axially upwards from said base 4d. In this tube 4f there is a small diameter piston 4g on the lower end of a piston rod 4h on the upper end of which there is a large diameter piston 4j in the upper end of the hollow ram 4a. This constitutes the differential piston 4b (in this example) by which hydraulic pressure applied in the cylinder 4c is intensified by virtue of the different diameter pistons thereby applying intensified hydraulic pressure under the hollow ram from which the roof is supported. For this purpose the base of the cylinder 4c and the upper end of the hollow ram 4a are connected by connections 4k, 4m respectively to a hydraulic circuit to be described, and the arrangement is such that after line pressure has been applied to the cylinder and held therein in known manner with the hollow ram prevented from further extension by the roof, line pressure is then applied to the hollow ram through the connection 4m thereby to apply downward pressure on the large diameter piston which is consequently forced downwards to intensify the pressure in the cylinder by the small diameter piston, the increase of pressure being in direct proportion to the difference in diameter of the piston heads, and the pressure being held by known type of valve control so that the roof is supported with a considerably greater pressure than that of the line pressure.

The main support structure as thus far described is connected to a similar main support structure (indicated by reference numerals 2'–9' FIGURE 1) disposed at the side of it to form master and slave supports which are interconnected by a horizontal hydraulic cylinder and ram 10 (see also FIGURES 2 and 4). The arrangement is such that, by suitable connection of the props 4, 5 (4', 5') with said cylinder and ram 10 in a hydraulic circuit (to be described) under control of suitable fluid control means, the master and slave support structures in turn can be contracted and advanced while the other is extended forming an anchorage.

In addition the working face conveyor 1 is controlled by a second horizontal cylinder and ram 1a (FIGURES 1, 2 and 4) connected hydraulically in said circuit for advance of the conveyor when required using the master roof support as an anchorage.

A hydraulic circuit for the control of the roof support as thus far described is shown in FIGURE 6.

Referring now to this FIGURE 6 in conjunction with FIGURE 1, the various pipeline connections indicated at "A" to "H" in FIGURE 6 are also indicated in FIGURE 1. These connections are between the master and slave props 4, 5, 4', 5', the horizontal support-advancing cylinder and ram 10, the conveyor-advancing cylinder and ram 1a, the master and slave auxiliary cantilever-operating devices 9, 9', a master control valve MCV mounted on the master support 2', a slave control valve SCV mounted on the slave support unit 2, a support-advancing operating ram disc valve ODV, and a conveyor ram disc valve CDV.

The master control valve MCV has four valves V1, V2, V3, V4, which are operated by cams, C1, C2, C3, C4 consequent upon turning of a handle H1.

The slave control valve SCV is similar, having four valves V5, V6, V7, V8, operated by cams C5, C6, C7, C8, consequent upon turning of a handle H2.

The support-advancing operating ram disc-valve ODV has four ports P1, P2, P3, P4 which by turning of the disc can be selectively coupled as required as in conventional disc valves.

The conveyor cam disc valve CDV is a similar disc valve having four ports P5, P6, P7, P8, and again controlled in conventional manner by turning of the disc.

The relation between the cams of the master and slave valves MCV and SCV is such that with the handles H1, H2 in one set position master and slave props 4, 5, 4′, 5′ become set to the roof by fluid pressure applied from line pressure M through the valves V4, V8 to lines B, F and from these lines to the connections such as 4k (FIGURE 3) and the main prop's cylinders. With the handles H1, H2 in a neutral position (FIGURE 6) none of the valves V1 to V8 are effective thereby providing a neutral condition in the circuit.

The handles H1, H2 may be turned to a third intensify position at which valves V3 and V7 are operated for fluid from the pressure line M to pass to lines A, E and from these lines to connections such as 4m (FIGURE 3) for intensification of pressure by the differential pistons. A fourth "release" position of the handles H1, H2 opens valves V1, V5 for release of the pressure to return line R and contraction of the prop.

In one position of the disc in the support-advancing operating ram disc valve ODV fluid pressure is allowed to pass through port P1 and line C to one end of the cylinder and ram 10 for advance of the master support unit. In a second position the condition may be neutral. In a third position port P3 may be open for fluid pressure to be applied through line D to the other end of the cylinder and ram 10 for advance of the slave support unit.

In one position of the disc in the conveyor ram disc valve CDV, port P5 is opened for fluid pressure to be applied through line H to one end of the conveyor ram for retraction of the ram.

A second position is for a neutral condition. A third position is in which port P7 is open for fluid pressure to be applied through line G to the other end of the conveyor ram for its extension to advance the conveyor.

There is also provided an auxiliary hydraulically extendible and contractable prop 11, 11′ which is transversibly suspended one from each cantilever head 2a, 2a′ to constitute a hanging prop.

The auxiliary props are substantially identical and therefore the following description confined to the prop 11 is equally applicable to the prop 11′, the various additional references for the prop 11′ being raised to the first degree.

More specifically each cantilever head 2a, 2a′ is of "I" section FIGURE 5 and the auxiliary prop 11 comprises a U-shaped head 11a which fits round the cantilever head and has two parallel side roof bars that carry inwardly directed lugs, rollers or abutments or the like 11b projecting in the spaces between the upper and lower flanges of the cantilever head, and, pivotally depending from the U-shaped head, a ram 11c projecting from a cylinder 11d. Also mounted on the U-shaped head 11a, there is a control valve 12 having hydraulic connection 13 with the auxiliary hanging prop, and as shown in FIGURE 1, hydraulic connection 14 with the main support structure 2.

The interior construction of each hanging prop 11 is shown in FIGURE 7A.

More specifically the ram 11c is hollow and it operates inside an inner cylinder 15 mounted within an outer guard cylinder 11d. The ram 11c is formed with a double acting piston head in two joined parts 16, 17, fluid being supplied through an inner pipe 18 in the ram 11c to the piston head part 16 in a prop-extending pressure chamber PEC and fluid being supplied through the hollow of the ram 11c and through a hole 19 in the ram wall to the piston head part 17 in a prop-contracting pressure chamber constituted by an annulus 20 between the ram 11c and the inner cylinder 15 the fluid reacting against a liner 21 projecting into said annulus 20 from the head end of the cylinder 11d.

Within the ram 11c there is also mounted a high pressure relief valve 22 controlling the high pressure of fluid below the piston head 16. In addition there are two inlet and outlet ports 23, 24 in the head of the ram 11c communicating respectively with the inner pipe 18 and the hollow of the ram 11c.

The control valve 12 (see FIGURES 7B to 7G) is of low pressure type having a disc valve member 25 which is rotatably mounted by a spindle 26 and is rotatable by a hand lever 27. This disc valve member 25 has an elongated hole 28 in it (FIGURES 7B, 7F) which extends completely through it, and an opposed and longer arcuate recess 29 disposed in its underneath face. For control by the disc valve member 25 there are four vertical ducts 30, 31, 32, and 33. The latter three ducts are on the same radius from the axis of the disc valve member 25 and the duct 30 is on a greater radius therefrom.

As shown in FIGURE 7B the duct 30 communicates between a port 34 and the top side of the disc valve member 25 whereas the other three vertical ducts communicate between the underside of the disc valve member 25 and ports 35, 36, 37 (see particularly FIGURE 7D).

The port 37 also communicates, via an inclined duct 38 (FIGURE 7C) with a high pressure ball valve 39 in a high pressure port 40. The high pressure ball valve 39 is positively controllable by a plunger 41 and a cam 42 mounted on the valve spindle 26.

As shown by the broken lines and arrows in the composite FIGURE 7, the fluid pressure line indicated at "M," communicates with the port 34, and in the neutral position of the valve as shown, fluid is directed up the vertical port 30 to above the disc valve member 25. Upon displacing the handle 27 into one position this brings the elongated hole 28 into communication with the vertical duct 31 (FIGURE 7D), so that the fluid from above the disc valve member 25 then passes downwardly through the duct 31 and out of the port 35 and through the port 24 in the ram 11c into the hollow of this ram, through the hole 19 and into the annulus 20 whereupon it acts on the piston head part 17 and contracts the auxiliary hanging prop 11. During this time fluid below the piston head part 16 returns through the inner pipe 18 out of the port 23 past the high pressure ball valve 39 (which has been opened by the handle turning of the cam 42) and through the ducts 38, 37 and 33, to the long arcuate recess 29 in the disc valve member 25 and out through duct 32 and port 36 to the return line indicated at "R."

Upon displacing the handle 27 to the other position the main line fluid entering the duct 34 passes up through the elongated hole 28 and down into the vertical duct 33 and from there, up through ducts 37, 38 to the high pressure ball valve 39 out of the port 40 and into the port 23 in the ram 11c. From this port 23 the fluid passes down the inner pipe 18 to below the piston head part 16 whereat it causes extension of the auxiliary hanging prop 11. During this time fluid from above the piston head part 17 passes back through the hole 19 through the hollow ram 11c out of the port 24 into the port 35 of the control valve, up the vertical duct 31 and through the long arcuate recess 29 to the vertical duct 32 and out of the port 36 back to the return line "R."

The control valve is in fact a low pressure valve by virtue of the disc valve member 25 but it is adapted for high pressure by the ball valve 39 and the cam operation.

In the neutral position of the disc valve member 25 the long arcuate recess 29 partially registers with ports 33 and 31 to enable the liquid relieved from the overload relief valve 22 on overload to escape to return line "R."

The high pressure relief valve 22 in the ram 11c is set at required high pressure to relieve excessive pressure under the piston head 16.

In operation of the support means so far described, it will be seen that at one stage (FIGURE 1) the conveyor 1 is close up to the working face "F" and the auxiliary hanging prop 11 is disposed in a state extended downwards to the ground on the goaf side of the conveyor and functions to minimize the roof load on the cantilever head 2a, 2a′.

Referring now to FIGURE 3 this shows a stage at which the cutting machine has travelled along the working face F whereby the roof is cut back and immediately this has been done, the supporting pressure in the master support unit 2 is relieved and the master support unit 2 is then advanced as shown to dispose the cantilever head 2a under the new roof part indicated at "P," while the auxiliary prop remains in extended roof supporting condition. In doing this the cantilever head 2a passes freely through the U-shaped head 11e.

Next the hanging prop 11 is contracted upwardly by suitable operation of the control valve 12 and, after tilting it laterally, as indicated by the prop 11' in FIGURE 5, it is passed along the cantilever head 2a over the conveyor 1 and under the new roof part "P" (FIGURE 3) at the free end of the cantilever head 2a. The hanging prop 11 is then straightened and re-extended downwardly, by suitable operation of the control valve 12, into roof supporting state under said roof part "P." Here again the hanging prop 11 functions to minimize the roof load on the cantilever head 2a and prevent undue bending of it.

Evidently when it is required for the conveyor 1 to be advanced up to the new working face by ram 1a, the hanging prop 11 is re-contracted upwardly and re-tilted to allow this. Following this the hanging prop 11 may be passed back partly along the cantilever head 2a and re-extended downwardly at the goaf side of the conveyor in a position similar to the starting position of FIGURE 1.

It will be understood that the slave support 2'-9' is similarly operated in turn including similar operation of the hanging prop 11'.

A particular advantage of the arrangement described is that, by virtue of the combined features of the alternately advancing master and slave supports 2, 2', the intensifier construction of the master and slave props 4, 5, 4', 5', the pressure operated devices 9, 9' for the cantilever heads, 2a, 2a', and the hanging props 11, 11', particularly adequate support is provided for the roof, the resistance to load offered by the support being controlled throughout by the load which it is required to bear. It is to be understood that the arrangement of the hanging prop 11 is applicable to other forms of mine roof supports. For example it may be employed in an instance where instead of there being side by side master and slave support units each advanceable using the other as an anchorage, there may be only one such support unit connected by a horizontal ram and cylinder to the conveyor, thereby to use the conveyor as the necessary stationary abutment, and employing the hanging prop to provide roof support whilst the support unit is advanced in contracted state.

If required, the tilting of the hanging prop 11 laterally may be effected automatically by the contraction thereof. This is illustrated in FIGURE 8 (with indexed references for the auxiliary prop 11') which shows that there may be provided an abutment arm 43 pivotally hanging from the prop head 11a, by a pivot 44, 44' and having a slotted connection 45 disposed in the upward path of the head of the cylinder 11d. In operation, as the cylinder 11d raises, its head engages the nose 46 which, being offset from the longitudinal axis of the auxiliary hanging prop 11 through its pivot 11e, tends to prevent further upward movement of the cylinder 11d: however the nose 46, 46' is free to swing on its pivot 44 with the result that further upward movement of the cylinder 11d results in the auxiliary hanging prop 11 becoming tilted carrying the abutment arm 43 with it as indicated in broken lines.

If desired also the displacement of the hanging prop 11 along the cantilever head 2a may be effected by power means. For example there may be provided a horizontal cylinder and ram device (hereinafter fully described in respect of prop 11' of the slave support) connecting the hanging prop 11 with the master unit 2, this cylinder and ram being hydraulically connected in the hydraulic circuit and controlled by suitable control valve means to extend and contract when required to effect the desired movement of the hanging prop 11.

In a modification an auxiliary hanging prop, such as the prop 11 is employed on a cantilever head extending rearwardly from the working face "F" for desired purposes. One such arrangement concerns the stowing of waste at the goaf side of a working passage and is illustrated in FIGURES 9 to 30.

Referring now to FIGURE 9 the usual coal face is indicated at CF and the usual rear face at RF of the working passage WP. For support of the roof in this passage there is usually provided a row of roof supports in this instance consisting of the said pairs of side by side supports 2, 2', each of which embodies the said pair of roof supporting props 4 and 5, 4' and 5' spanned by the said top beam 6, 6' and having the said forward cantilever head 2a, 2a'.

Each time a cut is made in the coal face CF, a corresponding row of the roof supports 2 is advanced, as indicated at the left hand side of FIGURE 9. This is usually done during what is known as a working shift.

In addition, there is provided at the rear of the rows of roof supports 2, 2', a stowing pipe 49 in releasably connected sectional lengths, this stowing pipe 49 being connected at a remote location to suitable means by which waste is fed into it and is delivered through it to a location in front of the rear face RF of the working passage WP.

There is further usually provided a rear row of individual roof supporting props "P" disposed behind the stowing pipe 49, and behind the rear row of props "P" there is provided sectional lengths of corrugated iron or other barriers 51 (FIGURE 10) for confining stowed waste to the rear location in the passage.

The usual arrangement is that after the working shift there is a stowing shift. During this stowing shift the slave support units 2' are advanced up to the coal face CF, into a position side by side with the already advanced master support units 2, as shown at the right hand side of FIGURE 9. The next operation is to advance a number of the rear props "P" opposite that length of coal face which has been cut by the previous working shift to a new position.

In addition sectional lengths of the stowing pipe 49 and barrier 51 are also advanced to a new position.

Immediately following this, the stowing mechanism is operated for the remaining unadvanced stowing pipe sections to deliver further waste behind the advanced barrier section 51.

The operations of advancing the rear props "P" and of the stowing pipe and barrier sections 49, 51, are usually carried out manually, thereby involving the disadvantages previously mentioned.

Referring now to FIGURE 11 showing the arrangement according to the invention, there is provided master and slave support units basically similar to the support units 2, 2' respectively by embodying the roof supporting props 4, 5, 4', 5', the top beams 6, 6', the front cantilever heads 2a, 2a', the storing pipe sections 49, and the barrier sections 51; in addition there is a rear row of roof supporting heads in the form of rear cantilever heads 52, and auxiliary props 50.

The rear cantilever heads 52 project rearwardly only from the top beams 6' of the slave support units 21 and they have the rear auxiliary props 50 suspendably mounted thereon, these rear auxiliary props 50 thereby constituting rear auxiliary hanging props.

In addition the stowing pipe sections 49 are also suspendably mounted on these rear cantilever heads 52 through the medium of hanging flexible elements 53 (see FIGURES 12 to 15). The barrier sections 5' are mounted on the rear of the rear hanging props 50.

In the example illustrated in FIGURE 11 the coal face CF is cut away in two stages and, whereas the roof supports are correspondingly re-arranged in stages, the stowing is only effected after the second stage.

More specifically, it will be seen from the left hand side of FIGURE 11 that at this stage a number of the main and slave support units 2, 2' are in their advanced positions and a number of the rear cantilever heads 52 project into the rear stowed face RF.

At the next stage to the right a cut has been made in the coal face CF, and a number of the master support units 2 have been advanced.

At the next stage to the right a number of the slave support units 2' have been advanced up to the coal face CF alongside the advanced master supports 2, and in doing so a number of the rear cantilever heads 52 are extracted from the rear face RF.

At the next stage to the right a second cut has been made in the coal face CF, and a number of the master supports 2' are further advanced.

Following these operations during a working shift, further operations as indicated at the right hand side of FIGURE 11 are carried out during a stowing shift.

These operations include advancing a number of the slave support units 2' up to the coal face alongside the further advanced master support units 2, and also the advance of stowing pipe and barrier sections 49, 51, opposite the cut face, whereupon further waste is stowed by the remaining unadvanced stowing pipe section 49 behind the advanced barrier section 51.

The system is further shown in FIGURES 12 to 16. FIGURE 12 shows the first stage, which is at the commencement of a working shift, when waste "W" has been stowed behind the previously advanced barrier section 51, both rows of supports 2 and 2' are in advanced position with the front cantilever heads such as 2a supporting the forward roof, and the rear cantilever heads 52 support the rear roof above the stowed waste behind the barriers 51.

FIGURE 13 illustrates the second stage whereat the first cut has been made in the coal face and the master support units 2 have been advanced up to the new coal face.

FIGURE 14 shows the third stage whereat the aforesaid working face conveyor 1 has been advanced to the new coal face, in addition to the advancement of a number of the slave support units 2' with their rear cantilever heads 52 which latter are accordingly withdrawn from the previously stowed waste, or are nearly fully withdrawn.

This withdrawing action of the rear cantilever heads 52 is effected relatively to the stationary rear hanging props 50 the stowing pipe 49, and the barrier 51, as permitted by the suspension mounting of the rear hanging props 50 and of the stowing pipe 49 on the rear cantilever heads 52.

Figure 15:
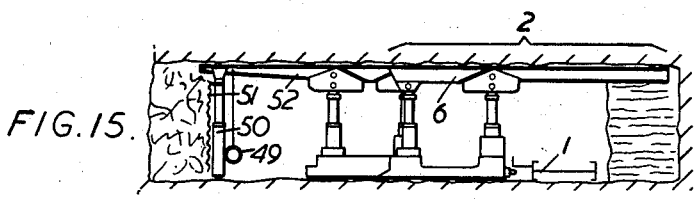

FIGURE 15 illustrates the fourth stage whereat a second cut has been made in the coal face and a number of the master support units 2 have been further advanced up to the new coal face. This is the end of the working shift.

Figure 16:
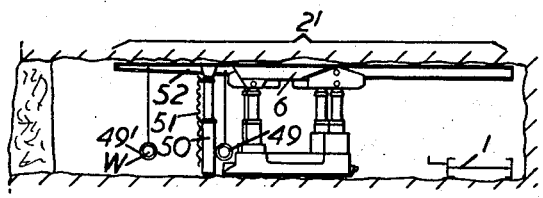

Referring now to FIGURE 16 this illustrates the stowing shift from which it will be seen that the slave supporting units 2' have been advanced up to the new face, and in doing so the rear cantilever heads 52 have been advanced only a short distance from the previously stowed waste. In addition the rear props 50 have been advanced (while the rear cantilevers 52 support the roof) along the rear cantilever heads 52 carrying with them sections of the stowing pipe 49 and barrier 51.

Following this, further waste "W" is delivered through the remaining unadvanced stowing pipe sections indicated at 49' into the space between the last stowed waste and the advanced barrier section 51 and consequently under the roof supported by the rear cantilever heads 52 substantially repeating the initial state of affairs of the first FIGURE 12 of stage in advanced position.

The particular advantages of this arrangement is that the rear roof is maintained supported substantially continuously by the rear cantilever heads 52, and advance of the rear hanging props 50, and of the stowing pipe and barrier section 49, 51, can be accomplished by suitable mechanical means in their form suspended on the rear cantilever heads 51.

Figure 17:
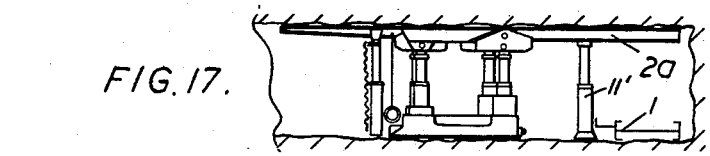
Figure 18:
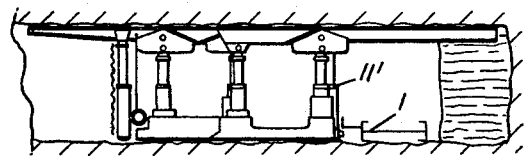
Figure 19:
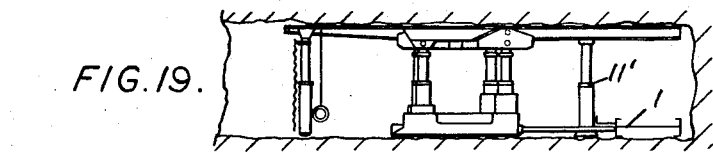

In a modification of the method as thus far described and as illustrated in FIGURES 17 and 19 there is employed a front auxiliary hanging prop 111, 111' which may be (as for the construction of FIGURES 1 to 7) disposed under the forward cantilever heads 2a, 2a', and at the immediate rear of the conveyor 1.

Conveniently all the pit props are of the aforesaid hydraulically operated type, each comprising a cylinder and ram, and embodied in a hydraulic circuit with suitable hydraulic jacks and valve means for effecting the various movements required hydraulically.

More specifically, each pair of master props 4, 5 is mounted on the aforesaid one base 3 (see for example FIGURE 13) each pair of slave props 4', 5' is mounted on the aforesaid other base 3', and the two bases 3, 3' are interconnected by the aforesaid horizontally disposed hydraulic jack for obtaining the advance movements of the master and slave support units 2, 2' in turn. Further horizontally disposed hydraulic jacks are associated with the top beams 6, 6', and are connected to the front and/or rear hanging props 50, 11, 11', for obtaining their advance movements. In addition suitable valves, ducts, and ports are provided for control of the jacks, and of extension and contraction of the props.

The master and slave props 4', 5', 4, and 5, in this example incorporate the aforesaid fluid pressure intensifier means. Both the front and the rear cantilever heads 2a', 2a, and 52 in this example have the aforesaid fluid pressure control for the cantilevers as evidenced by the slipper levers 2c', 2c, 2c'', in FIGURE 13.

Both the rear and front auxiliary hanging props 50, 11, 11', may be controlled by valve means substantially as described for the front hanging prop 11, 11'. However they may incorporate fluid operated valve control means as herein to be described to particularly ensure that fracture of an external pipeline, for instance, will not result in drop in pressure of the supporting pressure fluid in the props.

More specifically as shown for example at 50, in FIGURE 20, each prop 50, 11, 11' mainly consists of a pressure cylinder 118, and hollow ram 119. The pressure cylinder 118 has a base cap 120, a protective outer sheath 121, an upper gland ring 122, and pressure retaining seals 123, 124. The hollow ram 119 is guided at its upper end by the gland ring 122 and segmental bearings 125, and the upper end of the hollow ram 119 embodies a cap 126 having two ports 127, 128, for hydraulic fluid to enter and exhaust from the prop. The cap 126 has an outer recess positioning a seal 129 and an inner recess for a spigot 130A of a boss 130, the spigot 130A having a seal 131. From the boss 130, a tube 132 extends in the hollow ram 129, towards a piston head 140, of the hollow ram 119. Mounted in association with this piston head 140 there is a piston valve member 133, which is sealed by seals 135, and has fluid passages 134 communicating between the tube 132 and an annual fluid passage 134a which is controlled by a piston valve ball 137 biased by a spring 138 into passage closing position. A piston valve seating sleeve 139 containing the piston valve ball 137 and the piston valve member 133 is held to the piston head 140 by locking screw 141. The piston head 140 has a piston ring 142, sealing rings 143 and an end ring 144, the parts being retained by the locking screw 141 and a screw nut 141a.

The pressure cylinder 118 forms a pressure chamber 145 behind the piston head 140 and the latter also has associated with it a relief valve seating sleeve 146 (having a seal 147) and co-operating relief valve ball 148 which latter is biased by a relief valve spring 149 on a relief valve spindle 150 and bearing against a collar 151 and against a closed end of a cylinder 152 in which the relief valve spindle 150 and relief valve spring 149 are housed. The relief valve spring 149 is arranged to maintain the relief valve closed against working pressures, and to permit it opening under overload for the relief of pressure through a lateral port 153.

The hollow ram 119 has a hole 154 for the passage of fluid into an annulus between the hollow ram 119 and the pressure cylinder 118 for fluid under pressure therein to contract the prop.

In operation of these auxiliary hanging props 50, 11, 11', they are extended for roof support by operating a control valve to apply pressure fluid through the port 127 so as to open the piston ball valve 137, 139 and build up pressure in the pressure chamber 145 against the relief pressure of the relief valve 148, 152, and until the fluid pressure and the load on the prop balance whereupon the piston ball valve 137, 139 closes to retain the pressure.

Upon overload, the relief valve 148, 152 opens and fluid is allowed to exhaust through the hollow ram 119 and the port 128.

For contraction of the prop, said control valve is operated to apply fluid pressure through port 128 into the hollow ram 119, whilst the port 127 is opened to exhaust by said control valve. This pressure fluid applied in the hollow ram 119 causes build up of pressure in the annulus 155 tending to contract the prop which should be accompanied by discharge of fluid from the pressure chamber 145 past the piston valve ball 137.

This discharge is prevented by the pressure in chamber 145 urging the ball 137 into closed position on its seating until the pressure in the hollow ram 119 exceeds the pressure in the pressure chamber 145, whereupon the piston 133 is operated by the pressure in the hollow ram 119 to depress the ball 137 off its seating and open the piston ball valve 137, 139, so that the pressure is then released through the tube 132, in the hollow ram 119 and exhausts through the port 127.

It will be seen that by virtue of having the piston ball valve 137, 139 within the prop, this avoids the possibility of the prop collapsing by damage to external piping.

A more detailed arrangement where there is a rear auxiliary hanging prop as well as a front auxiliary hanging prop, slidable along the rear cantilever 52, is shown in FIGURES 21 to 30.

Hanging of the real auxiliary prop 50 on the rear cantilever 52 is accomplished by a U shaped head connection 50a, see FIGURES 21 to 23. This head 50a has a collar 156 drilled at 157 for a bolt, for securing to the said cap 126 of the rear hanging prop 50, the cap 126 being correspondingly drilled for a bolt at 158 (FIGURE 20). Spigots 159 project inwardly from side walls of the head 50a to be disposed between upper and lower outwardly directed flanges of the rear cantilever 52 thereby allowing relative pivotal and sliding action and up and down pivotal displacement of the rear cantilever 52 relative to the prop 50 to a limited degree, the rear cantilever 52 riding in the U shaped slot 160 between the side walls of the head 50a.

Hanging of the front auxiliary prop 11' (in this example non slidably) on the front cantilever 2a' of the slave support 2' is effected by a forked head 161 (see also FIGURES 24 and 25) which has a forked upper end 161b, a semispherical pad 161a welded to the base of the fork 161b, an intermediate tube 162, and a lower sleeve 163, which latter has a bolt drilling 164 co-operating with a corresponding bolt drilling such as 158 (FIGURE 20) in the top of the cap of the prop 11'.

There is also an elongated hole 161c in the walls of the fork 161b for a pin 165 each end of the pin 165 transfixing two pivoted top beams 166, 166', one on each side of the front cantilever head 2a' (FIGURES 28, 29) and extending through the front cantilever head 2a'.

For slidable adjustment of the rear auxiliary hanging prop 50 along the rear cantilever 52, the top beam 6 on the slave props 4' and 5' has horizontal jacks 171, 171a (FIGURES 26 and 30) on opposite sides of it respectively.

Considering now jack 171 this comprises a hollow ram 174 having one end block 184 which is secured by means 185 to the connecting head 50a pivoted at 250b to the rear auxiliary hanging prop 50 and which at its other end has a piston head 180 with seals 181, and a pressure cylinder 175 which is closed at one end whereat it is mounted on a trunnion pin 170 projecting sideways from the slipper lever 2c which at its other end is mounted in a block bearing 173 with an end cap 178, and a seal 179.

The jack 171 is connected hydraulically between the rear auxiliary hanging prop 50 and a disc control valve 167 (FIGURES 26 and 27) mounted on the same side of the slipper lever 2c'.

More specifically there is a flexible pipe connection 177 from the port 127 of the rear auxiliary hanging prop 50 to a port 184a in the block 184 leading to the interior of the hollow ram 174, a pipe connection 172 between a port in the block 173, the latter leading to the annulus between the hollow ram 174 and the pressure cylinder 175) and a "set" side of the control valve 167, and pipe 182 from a "release" side of the control valve 167 and leading to a port in the slave prop 5'. Pipe 168 connects the top of the control valve 167 to a pressure line, and pipe 169 connects the top of the control valve 167 to exhaust.

Accordingly, in addition to the jack 171 functioning to slidably displace the rear auxiliary hanging prop 50 on the rear cantilever head 52 it also serves for the transmission of fluid to and from the ports 127, 128 of the rear auxiliary hanging prop 50.

More specifically, hydraulic fluid is transmitted from the pipe 168 through the disc valve 167 through the pipe 172, and then through the end block 173 into the annulus between the ram 174 and the pressure cylinder 175; from this annulus the fluid passes through a port 176 in the hollow ram 174 into the interior of this hollow ram 174, and then through the pipes 177 to the port 127 in the rear auxiliary hanging prop 50 to extend the latter.

Pressure is retained in the pressure cylinder 175 to extend the ram 171 by the end cap 178 with its seal 179 and the piston 180 with its seals 181.

A cap screw 183 in the pivotal mounting of the jack 171 to the slipper lever 2c' controls the air pressure built up in the pressure cylinder 175 behind the piston 180 when the hollow ram 174 is withdrawn into the pressure cylinder 175.

The arrangement is similar in respect of the other jacks 171a which is connected hydraulically between the port 128 of the rear auxiliary hanging prop 50 and the control valve 167.

There is a second valve 167 (FIGURE 27) for operation of the front auxiliary hanging prop 11'. This second control valve 167a is on the same side as the jack 171a and is hydraulically coupled to the other control valve 167 with the same inlet 168 and exhaust 169.

Figure 27:
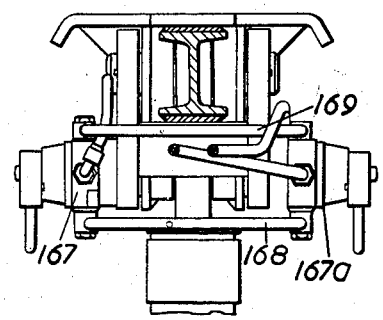
FIGURE 27 is an end view on line A—A of FIGURE 26.
Figure 29:
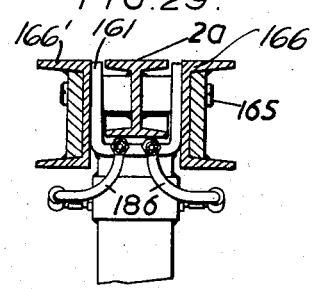
FIGURE 29 is a cross sectional view of said cross head on line B—B of FIGURE 28.
Figure 30:
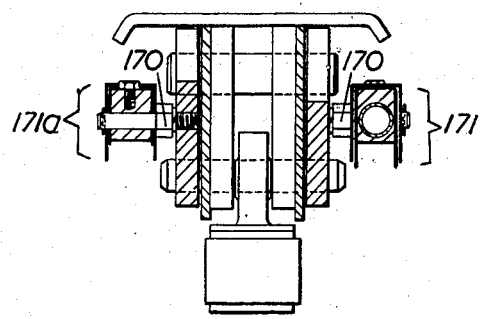
FIGURE 30 is a cross sectional view of said cross head on line C—C of FIGURE 26.
Figure 28:
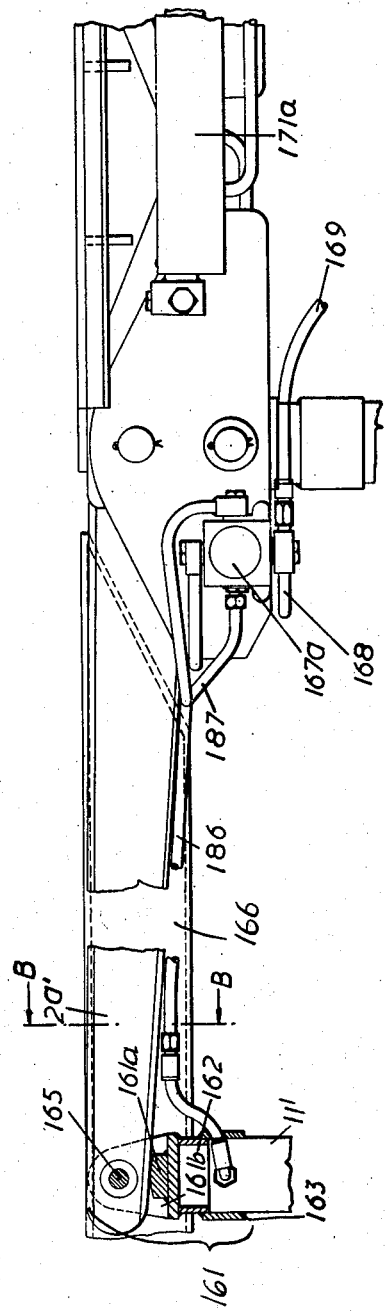
FIGURE 28 is a side elevation of said cross head with a front cantilever extension.

FIGURES 27 and 28 show how hydraulic fluid is admitted to the second control valve 167a from the pipe 168, from which it passes through the pipe 186 (FIGURE 29) to the port 127 of the front prop 11' for seating the latter.

Similarly, when the valve 167a is in release position, fluid is passed from the control valve 167a through a pipe 187 (FIGURE 28) to the port 128 of the front auxiliary hanging prop 11', this causing release of the front auxiliary hanging prop 11' from contact with the floor, whereupon it becomes suspended on the pin 165.

The modified construction of roof support shown in FIGURES 31 to 42 is primarily for use where the cutting machines, during one passage along the working face, make deep cuts of about 5'0" into the working face.

The roof supports are basically as already described comprising side by side master and slave support units 2, 2' (see FIGURES 31, 32) with bases 3, 3', main props 4, 5, 4', 5', top beams 6, 6', forward cantilever heads 2a, 2a', lower horizontal cylinder and ram 10 connecting the two supports and lower conveyor operating ram 1a. The props contain the aforesaid intensifier rams. The cantilever heads are pivoted to the top beams and have the aforesaid fluid control means as evidenced by the slipper levers 2c, 2c' (see FIGURE 36).

In addition the support is characterised by having a pair of front auxiliary hanging props as basically described for the props 50, 11, 11' by virtue of its interior construction according to FIGURE 20 and its suspension from the cantilever head 2a of the master support.

This modified support is further characterised by having the two forward hanging props 200, 201 pivotally suspended from auxiliary top beams 202, 203 respectively, one disposed at each side of the cantilever head 2a and each having a slidable connection on the cantilever head 2a and being slidably displaceable along the cantilever head 2a by upper auxiliary horizontal cylinder and ram units 204, 205 (see FIGURE 36) connecting between side rear parts of the top beam 6 and the hanging props 200, 201, respectively.

The auxiliary top beams 202, 203 are conveniently hollow to accommodate the rams of the upper ram units 204, 205 and they are connected by a channel slide 206 (FIGURE 32) which has inwardly directed flanges 207, 208 projecting into the spaces between upper and lower flanges 209, 210, 211, 212, of the cantilever head 2, which is of 1 section.

The master and slave supports are hydraulically controllable substantially as before described under control of manually operable valves whereof valves controlling the master support unit 2', 2 and operating the ram 1a for the conveyor respectively, and valves 215, 216, are for setting and intensifying the slave support and operating the lower ram 10 for advance of the supports.

The forward auxiliary hanging props are, through their upper rams 204, 205, also under control of manually operable valves whereof a valve 217 (FIGURE 31) is for advancing the auxiliary hanging props 200, 201, and setting them to the ground, and the other 218 is for retracting the auxiliary hanging prop 200, 201 and contracting them upwardly.

For obtaining further clearance below the auxiliary hanging props 200, 201, when contracted upwardly, they may be swingable sideways and upwardly either by mechanical means, as disclosed in FIGURE 8 or as shown in FIGURE 32 by a short double cylinder and ram 219 (FIGURE 32) which is mounted horizontally on the under side of the cantilever head 2a and having its rams directed laterally away from opposite sides of the cantilever head 2a to operate against abutments 220, 221, on the opposed sides of the top ends of the auxiliary hanging props, this double cylinder and ram unit being in a hydraulic circuit and operable under control of said manually operable valves 217, 218, in a manner to be described with reference to the hydraulic circuit of FIGURES 38 to 42.

The support is required to be operated as follows from the position of FIGURE 31 whereat both master and slave support units are in retracted roof support position and with the forward auxiliary hanging props 200, 201 about half way along the cantilever 2a in roof supporting condition immediately in front of the conveyor 1, the latter being spaced about 5'8" from the coal face for passage of a cutting machine CM to make a 5'0" cut into the working face.

Following the cut, the master support is lowered and advanced 2'6" and then re-set, during which the front auxiliary hanging props 200, 201, remain roof supporting and the cantilever head 2a rides through the channel connection 206, between the auxiliary top beams 202, 203, the upper cylinder and ram units, 204, 205 contracting during this operation.

Next the slave support is lowered, advanced, and reset with the result shown in FIGURE 33.

Following this the forward auxiliary hanging props 200, 201 are required to contract and to swing upwardly as shown in FIGURE 34. This releases the auxiliary top beams 202, 203 from the roof, and then the upper cylinder and ram units 204, 205 are extended to advance the auxiliary top beams 202, 203 along the cantilever head 2a carrying the forward auxiliary hanging props with them such that the latter travel over the conveyor 1 to a position behind the conveyor. These forward auxiliary hanging props are then re-extended to the ground to again become roof supporting as shown in full lines in FIGURE 35.

Next for allowing advance of the conveyor progressively the forward auxiliary hanging props 200, 201 are contracted and swing up progressively the conveyor being advanced 5'0" by the conveyor ram 1a, with the master support also advancing 2'6" and re-setting, and the forward auxiliary hanging props being re-extended to the ground when the conveyor is clearly behind them as shown in broken lines in FIGURE 5.

Following this the slave support is advanced 2'6" to result in the conditions of FIGURE 31, in advanced position.

The operation of the forward auxiliary hanging props are further described with reference to the hydraulic circuit diagrams of FIGURES 38 to 42.

The valves 217, 218 are disc valves whereof the discs 217a, 218a, are shown separately enlarged in their different relations in respect of a hole 217b, 218b, an arcuate slot 217c, 218c, and four ports 220, 221, 222, 223, 220a, 221a, 222a, 223a. The discs 217a, 218a are manually rotatably displaced by handles H2, H3.

From a feed M, fluid can pass up ports 223, 223a to above the disc holes 217b, 218b of the two valves and according to the position of the disc the fluid can then pass from the ports 220 and 220a to exhaust, or from the ports 221, 221a to opposite ends of the ram 204b, or from the ports 222, 222a to opposite ends of the ram 205b, and from the rams 204b, 205b to the forward auxiliary hanging props 200, 201 and from these props to the double cylinder and ram unit 219.

Referring first to FIGURE 38, this shows a state in which all the hydraulic members are set to the roof in load supporting condition; release of overload pressure from the forward auxiliary hanging props is through the ports 128, the interior of ram 205b and the annulus between the ram 205b and the cylinder 205a through the port 222a, and via the slot 218c through the release port 220a to the exhaust R1; the handles H3, H4, and the discs 217a, 218a are in neutral position.

FIGURE 39 shows a state in which the master support is lowered and advancing, with the forward auxiliary hanging props remaining roof supporting.

The advance of the master support contracts the cylinders 204a, 205a over the rams 204b, 205b, fluid from the rear of the rams being discharged through ports 222 and via the slot 217c through the exhaust port 220 to the exhaust line RI, and through port 221a via the slot 218c either through exhaust port 220a or port 222a to the annulus between the ram 205b and cylinder 205a.

The annulus between cylinder 204a and ram 204b is filled by partial transfer of fluid from the rear of ram 205b to the front of ram 204b through the ports 222, 221, via slot 217c. The handles H3 and H4 and discs 217a, 218a are in neutral as in FIGURE 1.

In the state shown in FIGURE 40 the forward auxiliary hanging props 200, 201 are being released and swing up. Handle H3 and disc 217a are rotated to a position in which the slot 217c prevents passage of fluid from the rear of ram 205b through the port 222.

Handle H4 and disc 218a are rotatably 90° allowing fluid from the feed M to pass through ports 218b and 222a to parts 128 in the hanging props 200, 201 to retract the latter. Fluid from the underside of the rams of the props 200, 201 being discharged through ports 127, through ports 221a, 220a and slot 218c to exhaust line RI.

FIGURE 41 shows how advance of the hanging props 200, 201 is accomplished. Handle H4 is left as in FIGURE 40, pressure from the feed M holding the hanging props in a contracted and angled condition by pressure behind the rams of the double cylinder and ram unit 219.

Handle H3 and its disc 217a are rotated until hole 217b admits fluid from the feed M through port 222 to the rear of ram 205b.

There is an area differential on the piston end of ram 205b and this causes the ram to advance the hanging props. The hanging props may be disposed in any position along the cantilever head 2a by returning the handle H3 to the position of FIGURE 40.

FIGURE 42 concerns re-setting of the hanging props. Handle H4 is returned to the position of FIGURE 38 allowing fluid to be discharged from the cylinder of the double unit 219, the fluid passing through the annulus between the ram 205b and the cylinder 205a through ports 221a, 220a via slot 218c to exhaust RI. Handle H3 is then moved to rotate disc 217a to a position in which slot 217c prevents transfer of fluid from the annulus between ram 204b and cylinder 204a to the exhaust RI through port 221.

Handle H4 is then moved to the position of FIGURE 42 admitting fluid from the feed M through hole 218b and 222a through cylinder 204a and ram 204b to setting ports 127 in the hanging props 200, 201 followed by returning to the position of FIGURE 38.

What I claim is:

1. Mine roof support means comprising a pair of hydraulically extendable and contractable support units each having a pair of spaced hydraulically extendable and contractable props mounted on a common base and having a common head, a hydraulically operable cylinder and ram interconnecting the two support units for advance of each in turn in side-by-side relationship when contracted using the other support unit in extended roof supporting condition as a stationary abutment, first hydraulic control means associated with said unit for controlling said movements, a cantilever roof girder projecting from at least one of said roof bars in continuation thereof and having lower laterally projecting webs, and an auxiliary prop of hydraulically extendable and contractable construction cooperating with said cantilever roof girder, said auxiliary prop comprising a cylinder and ram disposed under said cantilever roof girder, and a channel-shaped head pivotally mounted on said cylinder and ram and through which said cantilever roof girder extends, said auxiliary prop including a tiltable portion pivoted with relation to said head, and said head being of greater depth than that of the cantilever roof girder and having inwardly directed projections overlying said lower webs of said cantilever roof girder and of small size compared with the depth of the cantilever roof girder, and second hydraulic control means associated with said auxiliary prop, whereby freedom of movement is provided for between said cantilever roof girder and said head and said first and second hydraulic control means relatively are operable for both said unit having the cantilever roof girder and said auxiliary prop to be extended into roof supporting conditions in turn independently of the other while said other is contracted and advanced.

2. Mine roof support means as claimed in claim 1, having a second similar cantilever roof girder projecting from the roof bar of the other support unit, a second similar auxiliary prop similarly cooperating with this cantilever roof girder, and third hydraulic control means associated with the second auxiliary prop for controlling the latter's extending and contracting movements.

3. Mine roof support means comprising a hydraulically extendable, contractable and advanceable support unit, a cantilever roof girder projecting from said unit and having lower laterally projecting webs, an auxiliary prop of hydraulically extendable and contractable construction cooperating with said cantilever roof girder, said auxiliary prop having a channel-shaped head through which said cantilever roof girder extends, said auxiliary prop including a tiltable portion pivoted with relation to said head, and said head being of greater depth than that of the cantilever roof girder and having inwardly directed projections overlying said lower webs of said cantilever roof girder and of small size compared with the depth of the cantilever roof girder, a hydraulic cylinder and ram interconnecting said unit and said auxiliary prop, and hydraulic control means operably associated with said cylinder and ram for controlling operation of it to displace the auxiliary prop in contraction and suspension on the cantilever roof girder with the latter in extended roof supporting condition.

4. Mine roof support means comprising a hydraulically extendable, contractable and advanceable support unit, a cantilever roof girder projecting from said unit and having lower laterally projecting webs, an auxiliary prop of hydraulically extendable and contractable construction cooperating with said cantilever roof girder, said auxiliary prop having a channel-shaped head comprising a base under said cantilever roof girder and side roof bars at opposite sides of the latter and projecting from opposite ends of said head, said auxiliary prop including a tiltable portion pivoted with relation to said head, said head being of greater depth than that of the cantilever roof girder and having inwardly projecting abutments overlying said lower webs of said cantilever roof girder and of small size compared with the depth of said girder, a hydraulic cylinder and ram interconnecting said unit and said side roof bars, and hydraulic control means operably associated with said cylinder and ram for controlling operation of it to displace the auxiliary prop and side roof bars, with the auxiliary prop in contraction and suspension, along said cantilever roof girder with the latter in extended roof supporting condition.

5. Mine roof support means comprising in combination, a conveyor, a hydraulically extendable, contractable and advanceable support unit, a cantilever roof girder projecting from said unit and having lower laterally projecting webs, a channel-shaped head through which said cantilever roof girder extends, said head being of greater depth than that of the cantilever roof girder and having inwardly directed projections overlying said lower webs of said cantilever roof girder and of small size compared with the depth of the cantilever roof girder, a pair of side roof bars secured to opposite sides of said head, a pair of auxiliary hydraulic props pivotally hanging from said side roof bars respectively by pivots in the region of said head, hydraulic control means associated with said auxiliary props for control of their extension and contraction, and hydraulic plungers carried under said head and directed outwardly to said auxiliary props for acting on them to displace them outwardly about their pivots when contracted and in suspension on said cantilever roof girder for displacement therealong with said side roof bars over said conveyor.

6. Mine roof support means comprising a pair of hydraulically extendable, contractable and advanceable support units, each comprising a pair of spaced hydraulic props mounted on a common base and having a common roof bar and a differential piston mounted within each prop, hydraulic control means operably associated with said props for extending them and contracting them and for operating said differential piston to intensify the supporting pressure, a hydraulic cylinder and ram interconnecting the two units, hydraulic control means operably associated with said cylinder and ram for operating it to successively advance the units in side-by-side relationship when contracted using the other unit in extended roof supporting condition as a stationary abutment, a cantilever roof girder pivotally connected to each unit in continuation of its roof bar, a pair of hydraulic plungers in said hydraulic control means and operably associated one with each cantilever roof girder for application and release of upward pressure thereon, hydraulic means operably associating said hydraulic plungers to apply increased pressure to the roof girders, said cantilever roof girders having lower laterally projecting webs, an auxiliary hydraulic prop cooperating with at least one of the cantilever roof girders, said auxiliary prop having a channel-shaped head through which the latter cantilever roof girder extends, and said head being of greater depth than that of the latter cantilever roof girder and having inwardly directed projections overlying said lower webs of the latter cantilever roof girder and of small size compared with the depth of the latter cantilever roof girder, and hydraulic control means operably associated with said auxiliary prop for rendering it non-roof supporting in contraction and suspension and roof supporting in extension independently of the associated support unit in any position along the cantilever roof girder.

7. Mine roof support means in combination with a conveyor, said means comprising hydraulically extendable, contractable and advanceable support unit, a cantilever roof girder projecting from said unit and having lower laterally projecting webs, and an auxiliary prop of hydraulically extendable and contractable construction cooperating with said cantilever roof girder, said auxiliary prop having a channel-shaped head through which said cantilever roof girder extends, and said head being of greater depth than that of the cantilever roof girder and having inwardly directed projections overlying said lower webs of said cantilever roof girder and of small size compared with the depth of the cantilever roof girder thereby to provide for freedom of movement between said cantilever roof girder and said head sufficient for both said unit and said auxiliary prop to be extended into roof supporting condition in turn independently of the other while said other is contracted and advanced, and means enabling contraction of the auxiliary prop to an extent sufficient to be displaceable over said conveyor, wherein said auxiliary prop comprises said head and a cylinder and ram and hydraulic means operably associated with the cylinder and ram enabling relative contraction between them upwardly, and said cylinder and ram being pivotally connected to said head, whereby in addition to the cylinder and ram being contractable relative to each other upwardly, the contracted cylinder and ram being pivotally displaceable relative to the head to increase its height from the ground.

8. Mine roof support means in combination with a conveyor, said means comprising a hydraulically extendable, contractable and advanceable support unit, a cantilever roof girder projecting from said unit and having lower laterally projecting webs, and an auxiliary prop of hydraulically extendable and contractable construction cooperating with said cantilever roof girder, said auxiliary prop having a channel-shaped head through which said cantilever roof girder extends, and said head being of greater depth than that of the cantilever roof girder and having inwardly directed projections overlying said lower webs of said cantilever roof girder and of small size compared with the depth of the cantilever roof girder thereby to provide for freedom of movement between said cantilever roof girder and said head sufficient for both said unit and said auxiliary prop to be extended into roof supporting condition in turn independently of the other while said other is contracted and advanced, and means enabling contraction of the auxiliary prop to sufficient extent to be displaceable over said conveyor, wherein said auxiliary prop comprises said head and a cylinder and ram pivotally connected to said head, whereby in addition to the cylinder and ram being contractable relative to each other, the contracted cylinder and ram is pivotally displaceable relative to the head to increase its height from the ground, having the ram of the ram and cylinder uppermost and pivotally connected to said head, a control arm pivotally hanging from said head, a slotted connection between said control arm and said ram near said head, and said arm having a lower abutment part in the upward path of the cylinder during contraction of the cylinder and ram, whereby the final contracting movement of the cylinder causes the latter to engage said abutment part of said control arm which is thereby pivotally displaced to pivotally displace the cylinder and ram.

9. Mine roof support means comprising a hydraulically extendable, contractable and advanceable support unit, a cantilever roof girder projecting from said unit and having lower laterally projecting webs, and an auxiliary prop of hydraulically extendable and contractable construction co-operating with said cantilever roof girder, said auxiliary prop having a channel shaped head through which said cantilever roof girder extends, and said head being of greater depth than that of the cantilever roof girder and having inwardly directed projections overlying said lower webs of said cantilever roof girder and of small size compared with the depth of the cantilever roof girder thereby to provide for freedom of movement between said cantilever roof girder and said head sufficient for both said unit and said auxiliary prop to be extended into roof supporting condition in turn independently of the other while said other is contracted and advanced, wherein said auxiliary prop comprises said head and upper and lower components of cylinder and ram form and means forming a prop-contracting pressure chamber and a prop-extending pressure chamber, and hydraulic means are operatively associated with the two pressure chambers to extend and contract the auxiliary prop whereof in the contraction hydraulic pressure is applied in the prop-contracting pressure chamber so that the lower component is hydraulically raised on the upper component to a predetermined distance spaced upwardly from the ground, so that the auxiliary prop can then be advanced on the roof supporting cantilever roof girder without the necessity for lifting manually, and in the extension hydraulic pressure is applied in the prop-extending pressure chamber to render the auxiliary prop roof supporting while the cantilever roof girder is advanced by the contracted support unit.

10. Means as claimed in claim 9 wherein for obtaining the upward contraction of the auxiliary prop, the lower component is the cylinder, and the cylinder and ram co-operate to form an annular presure chamber between them to which pressure fluid is supplied.

11. Means as claimed in claim 10 wherein the cylinder forms a main pressure chamber under the ram for the extension of the auxiliary prop, valve means are operatively associated with this main presure chamber to maintain applied pressure therein and avoid collapse of the prop if external hydraulic pipes become fractured, and to allow for the required freedom of movement of the prop when contracted, there is a pipe connection in the prop extending from said valve means and main pressure chamber to an exterior pipe connection to the prop, and said exterior pipe connection is in the region of the top of the prop leaving the remainder of the prop free of pipe connections.

12. Mine roof support means comprising in combination first and second side by side pairs of hydraulic props, a common base under each pair of props, a roof bar on each pair of props, a horizontal hydraulic jack interconnecting the two pairs of props, a cantilever roof girder pivotally projecting from one of the roof bars and having lower laterally projecting webs, an auxiliary hydraulic prop having a channel shaped head through which said cantilever roof girder extends, and said head being of greater depth than that of the cantilever roof girder and having inwardly directed projections overlying said lower webs and of smaller size compared with the depth of the cantilever roof girder, said auxiliary prop comprising a cylinder and ram displaceably connected by said inward projections to said girder and means providing a prop-extending pressure chamber and a prop-contracting pressure chamber, and hydraulic control means operably associated with the two pairs of hydraulic props for extending and contracting them in turn, also operably asociated with the horizontal hydraulic jack for advancing each pair of props in turn and in contracted condition while the other pair of props is in extended condition, and further operably associated with the two pressure chambers of the auxiliary prop for pressure in the prop-extending chamber to extend the auxiliary prop while the cantilever roof girder is advanced by advance of its associated pair of props and for pressure in the prop-contracting pressure chamber to contract the auxiliary prop with an upward movement under hydraulic power, whereby the auxiliary prop can be readily advanced over a conveyor while the pair of props having the cantilever roof girder is in the extended condition.

13. Mine roof support means as claimed in claim 12 having a second cantilever roof girder projecting from the roof bar of one of the pairs of props in opposite direction to that of the first mentioned cantilever roof girder, and a second auxiliray prop similar to the first mentioned auxiliary prop and similarly associated with the second cantilever roof girder, with second hydraulic control means associated with the first mentioned hydraulic control means for similar control of the second auxiliary prop, whereby the second cantilever roof girder can have stowing pipe sections displaceably suspended from it, and waste barrier sections can be attached to the second auxiliary prop and be advanced therewith while the pair of props having the second cantilever roof girder is in the extended condition.

14. Mine roof support means as claimed in claim 12 having seated type valve means operably associated with the prop-extending chamber to maintain applied pressure therein and avoid collapse of the auxiliary prop if external hydraulic pipes become fractured.

References Cited in the file of this patent

UNITED STATES PATENTS

| | | |
|---|---|---|
| 2,641,906 | Knights | June 16, 1953 |
| 2,694,293 | Perrin et al. | Nov. 16, 1954 |
| 2,801,522 | Kuhn | Aug. 6, 1957 |
| 2,854,952 | Wilson | Oct. 7, 1958 |
| 2,869,514 | Gluss | Jan. 20, 1959 |

FOREIGN PATENTS

| | | |
|---|---|---|
| 517,367 | Belgium | Feb. 28, 1953 |
| 555,311 | Belgium | Mar. 15, 1957 |
| 773,407 | Great Britain | Apr. 24, 1957 |
| 910,770 | Germany | May 6, 1954 |
| 928,887 | Germany | June 13, 1955 |

OTHER REFERENCES

German application 1,016,211, printed Sept. 26, 1957 (Kl. 5d 14/01)